US010015293B2

(12) United States Patent
Seed et al.

(10) Patent No.: US 10,015,293 B2
(45) Date of Patent: Jul. 3, 2018

(54) METHOD AND APPARATUS FOR INCORPORATING AN INTERNET OF THINGS (IOT) SERVICE INTERFACE PROTOCOL LAYER IN A NODE

(71) Applicant: IOT HOLDINGS, INC., Wilmington, DE (US)

(72) Inventors: Dale N. Seed, Allentown, PA (US); Chonggang Wang, Princeton, NJ (US); Lijun Dong, San Diego, CA (US)

(73) Assignee: IOT Holdings, Inc., Wilmington, DE (US)

( * ) Notice: Subject to any disclaimer, the term of this patent is extended or adjusted under 35 U.S.C. 154(b) by 141 days.

(21) Appl. No.: 14/766,741

(22) PCT Filed: Feb. 7, 2014

(86) PCT No.: PCT/US2014/015396
§ 371 (c)(1),
(2) Date: Aug. 7, 2015

(87) PCT Pub. No.: WO2014/124318
PCT Pub. Date: Aug. 14, 2014

(65) Prior Publication Data
US 2015/0381776 A1    Dec. 31, 2015

Related U.S. Application Data

(60) Provisional application No. 61/762,530, filed on Feb. 8, 2013.

(51) Int. Cl.
*H04L 29/08* (2006.01)
*H04W 4/70* (2018.01)
(Continued)

(52) U.S. Cl.
CPC .......... *H04L 69/321* (2013.01); *G06F 9/5072* (2013.01); *H04L 5/0055* (2013.01);
(Continued)

(58) Field of Classification Search
CPC .................................................. G06K 7/10009
(Continued)

(56) References Cited

U.S. PATENT DOCUMENTS 5,764,518 A * 6/1998 Collins ................... B25J 9/1617
700/117
7,844,035 B2 * 11/2010 Pietrowicz .............. H04M 3/46
379/48
(Continued)

FOREIGN PATENT DOCUMENTS

CN          102857566 A        1/2013

OTHER PUBLICATIONS

Gnawali et al., "The Minimum Rank With Hysteresis Objective Function", Internet Engineering Task Force (IETF), RFC 6719, Sep. 2012, 13 pages.
(Continued)

*Primary Examiner* — Md S Elahee
(74) *Attorney, Agent, or Firm* — Condo Roccia Koptiw LLP

(57) ABSTRACT

A method and apparatus are described for incorporating an Internet of Things (IoT) service interface protocol layer in at least one node. The format of various IoT messages used to communicate over a service interface are also described. A set of IoT service level operations may be defined in the node. The IoT service level operations may be performed on IoT information elements (IEs). The IoT service level operations may be defined in terms of various actions that are generic and applicable across industry verticals. The operations may leverage each other as sub-operations, (e.g.,
(Continued)

collaborate, share, synchronize, discover, associate, collect, aggregate, concatenate, share, relocate, invoke, delegate or surrogate). The IoT IEs may include at least one of a content IoT IE, a context IoT IE, a policy IoT IE, a decision IoT IE, an event IoT IE, a discovery IoT IE or a descriptor IoT IE.

26 Claims, 20 Drawing Sheets

(51) Int. Cl.
  *H04W 4/38* (2018.01)
  *H04W 4/00* (2018.01)
  *G06F 9/50* (2006.01)
  *H04L 5/00* (2006.01)
(52) U.S. Cl.
  CPC .............. *H04L 67/02* (2013.01); *H04L 67/16* (2013.01); *H04W 4/005* (2013.01); *H04W 4/006* (2013.01); *H04W 4/38* (2018.02); *H04W 4/70* (2018.02)
(58) Field of Classification Search
  USPC ................. 379/88.08, 48, 88.12; 340/10.1; 455/411, 512; 700/95; 712/30
  See application file for complete search history.

(56) References Cited

U.S. PATENT DOCUMENTS

| | | | |
|---|---|---|---|
| 9,071,657 B2* | 6/2015 | Li | H04L 67/34 |
| 2008/0133731 A1 | 6/2008 | Bradley et al. | |
| 2009/0003541 A1* | 1/2009 | Hilt | H04M 3/533 379/88.12 |
| 2009/0247204 A1* | 10/2009 | Sennett | H04W 16/14 455/512 |
| 2010/0023952 A1 | 1/2010 | Sandoval et al. | |
| 2010/0082941 A1* | 4/2010 | Duvalsaint | G06F 9/5027 712/30 |
| 2010/0273450 A1* | 10/2010 | Papineau | G06F 8/60 455/411 |
| 2015/0235060 A1* | 8/2015 | Liao | G06K 7/10009 340/10.1 |

OTHER PUBLICATIONS

GSMA OneAPI, "GSMA one API Exchange Architecture for Cross-operator Network APIs", London UK, Feb. 2013, 6 pages.

Hui et al., "Compression Format for IPv6 Datagrams Over IEEE 802.15.4-Based Networks", Internet Engineering Task Force (IETF), RFC 6282, Sep. 2011, 24 pages.

Interdigital, Inc., "Standardized M2M Software Development Platform", Whitepaper, 2011, pp. 1-17.

Interdigital, Inc., "Standardized Machine-to-Machine (M2M) Software Development Platform", Whitepaper, Oct. 2012, 20 pages.

Levis et al., "The Trickle Algorithm", Internet Engineering Task Force (IETF), RFC 6206, Mar. 2011, 13 pages.

Montenegro et al., "Transmission of IPv6 Packets over IEEE 802.15.4 Networks", Network Working Group, RFC 4944, Sep. 2007, 30 pages.

Nottingham, M., "Web Linking", Internet Engineering Task Force (IETF), RFC 5988, Oct. 2010, 23 pages.

Shelby et al., "Constrained Application Protocol (CoAP) Draft-Ietf-Core-Coap-12", CoRE Working Group, Internet-Draft, Oct. 2012, 108 pages.

Shelby, Z., "Constrained Restful Environments (Core) Link Format", Internet Engineering Task Force (IETF), RFC 6690, Aug. 2012, 22 pages.

Vasseur et al., "Routing Metrics Used for Path Calculation in Low-Power and Lossy Networks", Internet Engineering Task Force (IETF), RFC 6551, Mar. 2012, 30 pages.

W3C, "Semantic Web", Available on Internet http://www.w3.org/standards/semanticweb/, 2015, 2 pages.

W3C, "Web Applications Working Group Charter", Interaction Domain, Available on internet http://www.w3.org/2012/webapps/charter/ , Sep. 30, 2013, 13 pages.

W3C, "Web Services Description Language (WSDL) 1.1", W3C Note, Available on Internet http://www.w3.org/TR/wsdl ,Mar. 15, 2001, 33 pages.

Winter et al., "RPL: IPv6 Routing Protocol for Low-Power and Lossy Networks", Internet Engineering Task Force (IETF), RFC 6550, Mar. 2012, 157 pages.

* cited by examiner

| SMART IoT SERVICE INTERFACE | APPLICABLE SERVICE INTERFACE SUB-OPERATIONS | EXAMPLES OF APPLICABLE IoT INFORMATION ELEMENTS (IEs) | | | | | | |
|---|---|---|---|---|---|---|---|---|
| | | CONTENT | CONTEXT | POLICY | DECISION | EVENT | DISCOVERY | DESCRIPTOR |
| CONNECT/DISCONNECT | | | | | | | | ✓ |
| PUBLISH/UN-PUBLISH | COLLABORATE, SHARE, SYNCHRONIZE | ✓ | ✓ | ✓ | ✓ | ✓ | ✓ | ✓ |
| DISCOVER | COLLABORATE | | | | | | ✓ | |
| ASSOCIATE/DE-ASSOCIATE | DISCOVER | | | | | | | ✓ |
| COLLECT | DISCOVER, ASSOCIATE | ✓ | ✓ | ✓ | ✓ | ✓ | | ✓ |
| COMPOSE/DE-COMPOSE | COLLECT, AGGREGATE, CONCATENATE | ✓ | ✓ | ✓ | ✓ | ✓ | | ✓ |
| SUBSCRIBE/UN-SUBSCRIBE/NOTIFY | COLLECT | ✓ | ✓ | ✓ | ✓ | ✓ | ✓ | ✓ |
| CONCATENATE/DE-CONCATENATE | COLLECT | ✓ | ✓ | ✓ | ✓ | ✓ | | |
| AGGREGATE | COLLECT | ✓ | ✓ | ✓ | ✓ | ✓ | | ✓ |
| SHARE | COLLECT | ✓ | ✓ | ✓ | ✓ | ✓ | ✓ | ✓ |
| RELOCATE | COLLECT | ✓ | ✓ | ✓ | ✓ | ✓ | ✓ | ✓ |
| SYNCHRONIZE | SHARE | ✓ | ✓ | ✓ | ✓ | ✓ | ✓ | ✓ |
| REVOKE | SYNCHRONIZE | ✓ | ✓ | ✓ | ✓ | ✓ | ✓ | ✓ |
| DELEGATE | RELOCATE | | | | | | | ✓ |
| SURROGATE | SHARE, SYNCHRONIZE | | | | | | | ✓ |
| RELIEVE | SYNCHRONIZE | | | | | | | ✓ |
| INVOKE | ASSOCIATE | ✓ | ✓ | ✓ | ✓ | ✓ | | |
| INTERPRET | INVOKE | ✓ | ✓ | ✓ | ✓ | ✓ | | |
| ANNOTATE | INVOKE | ✓ | ✓ | ✓ | ✓ | ✓ | | |
| EXTRACT | INVOKE | ✓ | ✓ | ✓ | ✓ | ✓ | | |
| SPAWN/CEASE COLLABORATION | INVOKE | ✓ | ✓ | ✓ | ✓ | ✓ | | ✓ |
| DECIDE | INVOKE | ✓ | ✓ | ✓ | ✓ | ✓ | | |
| ADAPT | INVOKE | ✓ | ✓ | ✓ | ✓ | ✓ | | |
| VIRTUALIZE/DE-VIRTUALIZE | INVOKE, DELEGATE, SURROGATE | ✓ | ✓ | ✓ | ✓ | ✓ | | ✓ |

FIG. 7

| FIELD | DESCRIPTION |
|---|---|
| requesterID | IDENTIFIER OF ISSUER OF THE SERVICES INTERFACE REQUEST. |
| targetedServiceID(s) | ADDRESS OR IDENTIFIER OF AN IoT SERVICE INSTANCE OR GROUP OF SERVICE INSTANCE(S) BEING TARGETED BY REQUEST. |
| OPERATION(S) | ONE OR MORE IoT SERVICE INTERFACE OPERATIONS TO BE PERFORMED BY A TARGETED SERVICE INSTANCE. |
| transID | IDENTIFIER FOR THE REQUEST. USED BY THE ISSUER FOR MATCHING REQUESTS AND RESPONSES AND DUPLICATE REQUEST/RESPONSE DETECTION. |
| informationElement(s) | ONE OR MORE IoT INFORMATION ELEMENTS (OR LINKS TO ELEMENTS) UPON WHICH A SPECIFIED OPERATION IS TO BE PERFORMED ON, OR AN OPERATION IS TO BE QUALIFIED BY. |
| infoElementFormat(s) | FORMAT OF INFORMATION ELEMENT(S) INCLUDED IN REQUEST. |
| PROXY | ADDRESS OR IDENTIFIER OF AN EXPLICITLY TARGETED IoT SERVICE INTERFACE PROXY OR AN INDICATOR OF WHETHER THIS REQUEST AND/OR CORRESPONDING RESPONSE IS ALLOWED TO BE SERVICED BY AN IoT SERVICE INTERFACE PROXY. |
| PRIORITY | USED TO PROVIDE PRIORITY, SCHEDULE AND/OR ORDERING INFORMATION TO A TARGETED SERVICE INSTANCE THAT CAN BE USED TO PROCESS REQUEST. USEFUL WHEN PRIORITIZING MULTIPLE OPERATIONS (EITHER IN THE SAME REQUEST OR DIFFERENT REQUESTS) WITH RESPECT TO ANOTHER. |
| ENRICH | USED TO SPECIFY IF A SERVICE INSTANCE OR PROXY IS PERMITTED TO PERFORM OPPORTUNISTIC ENRICHMENT OF IoT INFORMATION ELEMENTS WHICH ARE CACHED OR WHICH FLOW THROUGH (e.g., ADD/REFINE CONTEXT INFORMATION CONTAINED IN A CONTEXT INFORMATION ELEMENT). |
| triggerCond | USED TO SPECIFY POLICIES OR CONTEXT CONDITIONS THAT ARE TO BE USED TO QUALIFY IF/WHEN AN OPERATION IS TO BE PERFORMED BY A TARGETED SERVICE INSTANCE. |

FIG. 8

| FIELD | DESCRIPTION |
|---|---|
| transID | IDENTIFIER SPECIFIED IN CORRESPONDING REQUEST. USED BY THE ISSUER FOR MATCHING REQUESTS AND RESPONSES AND DUPLICATE REQUEST/RESPONSE DETECTION. |
| statusCode(s) | STATUS INFORMATION REGARDING OPERATION(S) PERFORMED. |
| informationElement(s) | ONE OR MORE IoT INFORMATION ELEMENTS (OR LINKS TO ELEMENTS) UPON WHICH SPECIFIED OPERATION(S) HAVE BEEN PERFORMED UPON. |
| infoElementFormat(s) | FORMAT OF INFORMATION ELEMENT(S) INCLUDED IN RESPONSE. |
| CACHE | AN INDICATOR OF WHETHER THIS RESPONSE IS ALLOWED TO BE CACHED BY A SERVICE INTERFACE PROXY AND FOR HOW LONG. |
| PRIORITY | USED TO PROVIDE PRIORITY, SCHEDULE AND/OR ORDERING INFORMATION TO A TARGETED SERVICE INSTANCE THAT CAN BE USED TO PROCESS RESPONSE. ESPECIALLY USEFUL WHEN RESPONSE IS PROCESSED BY AN INTERMEDIATE SERVICE INTERFACE PROXY. |
| ENRICH | USED TO SPECIFY IF A SERVICE INSTANCE OR PROXY IS PERMITTED TO PERFORM OPPORTUNISTIC ENRICHMENT OF IoT INFORMATION ELEMENTS WHICH ARE CACHED OR WHICH FLOW THROUGH (e.g., ADD/REFINE CONTEXT INFORMATION CONTAINED IN A CONTEXT INFORMATION ELEMENT). |

FIG. 9

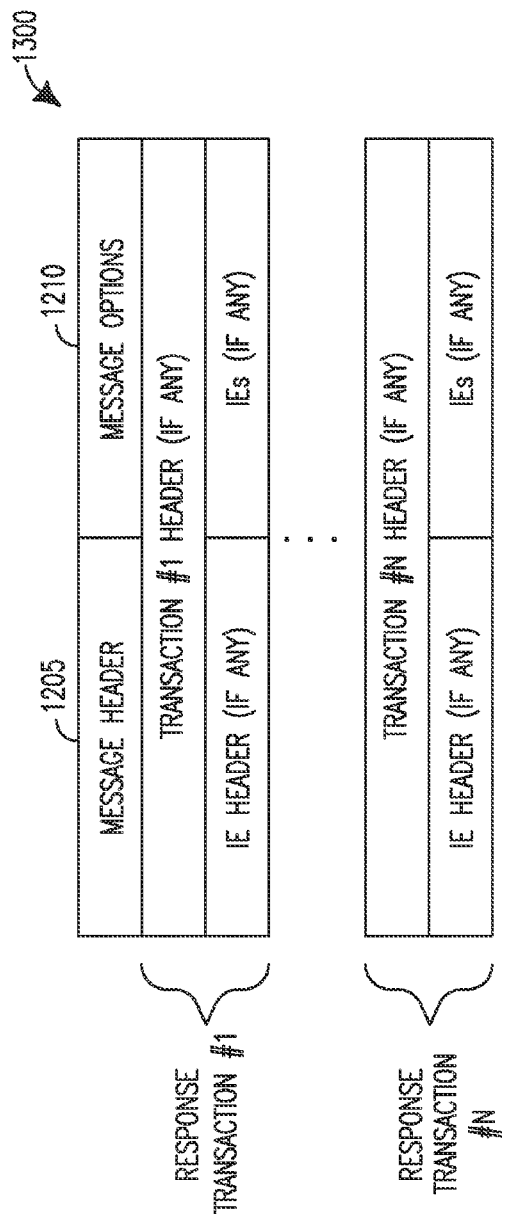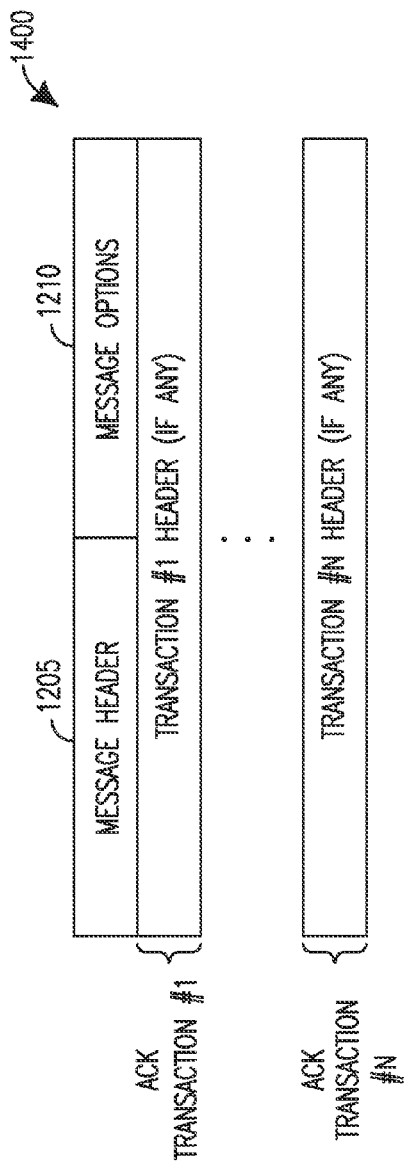
FIG. 13
FIG. 14

FIG. 15

| VERSION | MESSAGE TYPE | MESSAGE ID | MESSAGE OPTION COUNT | QoS |
|---|---|---|---|---|
| 1505 | 1510 | 1515 | 1520 | 1525 |

| MESSAGE OPTION CODE | MESSAGE OPTION LENGTH | APPLICABILITY TO OPERATIONS | MESSAGE OPTION VALUE |
|---|---|---|---|
| 1605 | 1610 | 1615 | 1620 |

| TRANSACTION TYPE | TRANSACTION ID | NUMBER OF OPERATIONS | RESPONSE/ACK CODE |
|---|---|---|---|
| 1705 | 1710 | 1715 | 1720 |

| OPERATION ID | OPERATION TYPE | OPERATION OPTION COUNT | OPERATION LENGTH |
|---|---|---|---|
| 1805 | 1810 | 1815 | 1820 |

1800

| 1905 | 1910 | 1915 | 1920 |
|---|---|---|---|
| OPERATION OPTION CODE | OPERATION OPTION LENGTH | APPLICABILITY TO INFORMATION ELEMENTS | OPERATION OPTION VALUE |

| 2005 | 2010 | 2015 | 2020 |
|---|---|---|---|
| INFORMATION ELEMENT ID | INFORMATION ELEMENT TYPE | INFORMATION ELEMENT CONTENT TYPE | INFORMATION ELEMENT LENGTH |

| INFORMATION ELEMENT |
|---|

METHOD AND APPARATUS FOR INCORPORATING AN INTERNET OF THINGS (IOT) SERVICE INTERFACE PROTOCOL LAYER IN A NODE

CROSS REFERENCE TO RELATED APPLICATIONS

This application is the National Stage Entry under 35 U.S.C. § 371 of Patent Cooperation Treaty Application No. PCT/US2014/015396, filed Feb. 7, 2014, which claims the benefit of U.S. Provisional Application Ser. No. 61/762,530 filed Feb. 8, 2013, the contents of which are incorporated herein by reference in their entirety.

BACKGROUND

A web service is a software function hosted at a network accessible address over the World Wide Web, (i.e., the Internet). A typical web service may have an interface which is used by web-based applications, or other web services, to invoke the web service. Representational state transfer (REST)-based (hereinafter referred to as RESTful) web services may have interfaces consisting of a set of addressable resources that may be accessed in a stateless manner using a set of RESTful operations. Simple object access protocol (SOAP)-based web services may have interfaces consisting of an arbitrary set of procedures which may be invoked.

Current web services may lack standardized service level interfaces. Instead, web service interfaces may use proprietary interfaces. For example, SOAP-based web services may support their own proprietary set of interface procedures, while RESTful web services may support their own proprietary set of interface resources. This may create a problem, since to effectively interface to a web service may require the developer of an application to customize that application such that it is compatible with each web service it interfaces.

SUMMARY

A method and apparatus are described for incorporating an Internet of Things (IoT) service interface protocol layer in at least one node. The format of various IoT messages used to communicate over a service interface are also described. A set of IoT service level operations may be defined in the node. The IoT service level operations may be performed on IoT information elements (IEs). The IoT service level operations may be defined in terms of various actions that are generic and applicable across industry verticals. The operations may leverage each other as sub-operations, (e.g., collaborate, share, synchronize, discover, associate, collect, aggregate, concatenate, share, relocate, invoke, delegate or surrogate). The IoT IEs may include at least one of a content IoT IE, a context IoT IE, a policy IoT IE, a decision IoT IE, an event IoT IE, a discovery IoT IE or a descriptor IoT IE.

BRIEF DESCRIPTION OF THE DRAWINGS

A more detailed understanding may be had from the following description, given by way of example in conjunction with the accompanying drawings wherein:

FIG. 4 shows an example of the types of network nodes and devices that Internet of Things (IoT) services may be deployed on;

FIG. 7 shows a list of smart IoT service interface operations, applicable service interface sub-operations, and examples of applicable IoT information elements (IEs);

FIG. 8 shows IoT fields and corresponding service interface request primitive descriptions;

FIG. 9 shows IoT fields and corresponding service interface response primitive descriptions;

FIG. 13 shows an example IoT service interface response message;

FIG. 14 shows an example IoT service interface acknowledgement message;

FIG. 15 shows an example IoT service interface message header format;

FIG. 16 shows an example IoT service interface message option format;

FIG. 17 shows an example IoT service interface message transaction header format;

FIG. 18 shows an example IoT service interface message operation header format;

FIG. 19 shows an example IoT service interface message operation option format;

FIG. 20 shows an example IoT service interface message IE header format;

FIG. 21 shows an example IoT service interface message IE format;

DETAILED DESCRIPTION

Figure 1A:
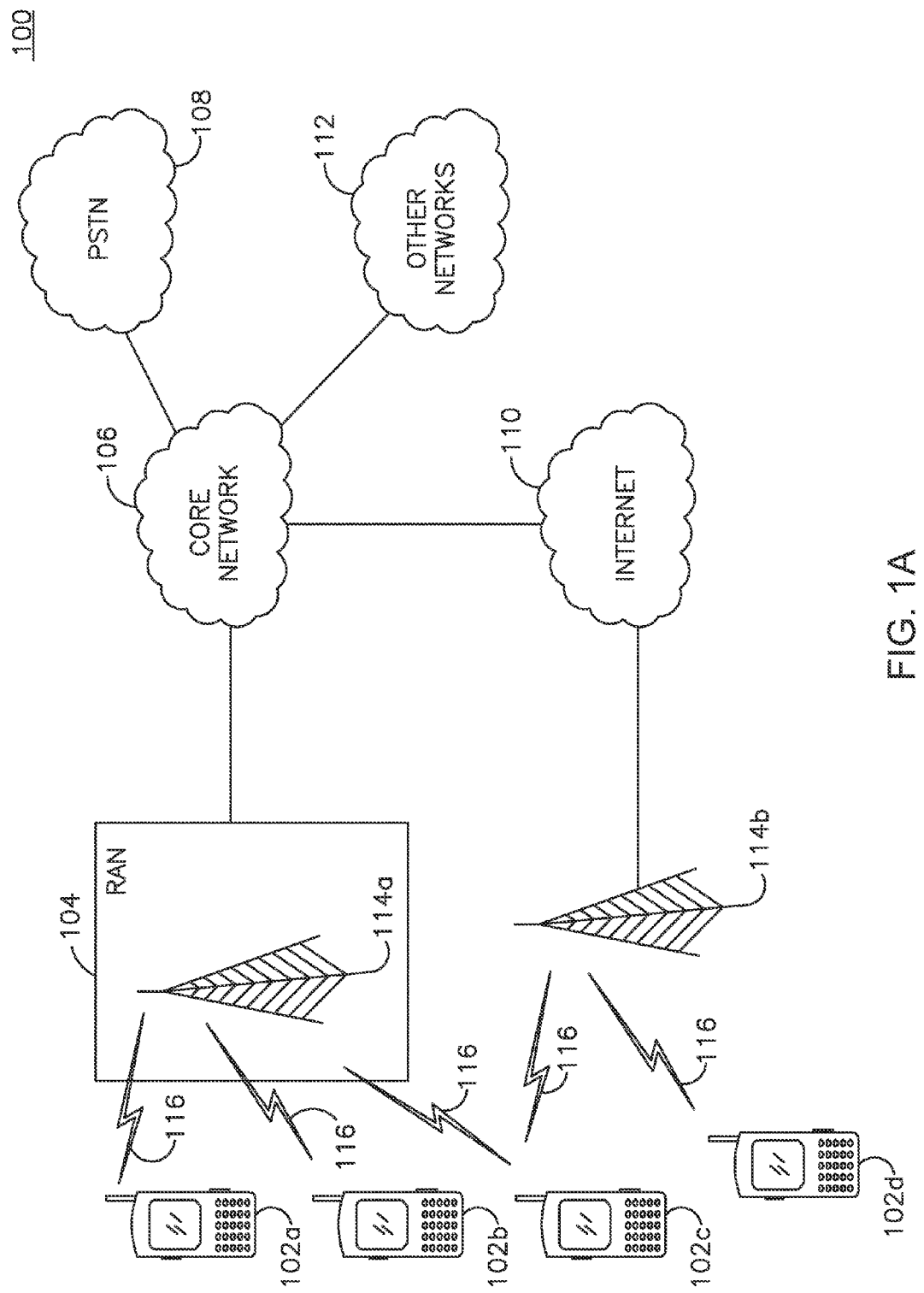
FIG. 1A shows an example communications system in which one or more disclosed embodiments may be implemented.

FIG. 1A shows an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an evolved Node-B (eNB), a home Node-B (HNB), a home eNB (HeNB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, and the like). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as universal mobile telecommunications system (UMTS) terrestrial radio access (UTRA), which may establish the air interface 116 using wideband CDMA (WCDMA). WCDMA may include communication protocols such as high-speed packet access (HSPA) and/or evolved HSPA (HSPA+). HSPA may include high-speed downlink packet access (HSDPA) and/or high-speed uplink packet access (HSUPA).

In another embodiment, the base station 114a and the WTRUs 102a, 102b, 102c may implement a radio technology such as evolved UTRA (E-UTRA), which may establish the air interface 116 using long term evolution (LTE) and/or LTE-advanced (LTE-A).

In other embodiments, the base station 114a and the WTRUs 102a, 102b, 102c may implement radio technologies such as IEEE 802.16 (i.e., worldwide interoperability for microwave access (WiMAX)), CDMA2000, CDMA2000 1x, CDMA2000 evolution-data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), GSM/EDGE RAN (GERAN), and the like.

The base station 114b in FIG. 1A may be a wireless router, HNB, HeNB, or AP, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT, (e.g., WCDMA, CDMA2000, GSM, LTE, LTE-A, and the like), to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over Internet protocol (VoIP) services to one or more of the WTRUs 102a, 102b, 102c, 102d. For example, the core network 106 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
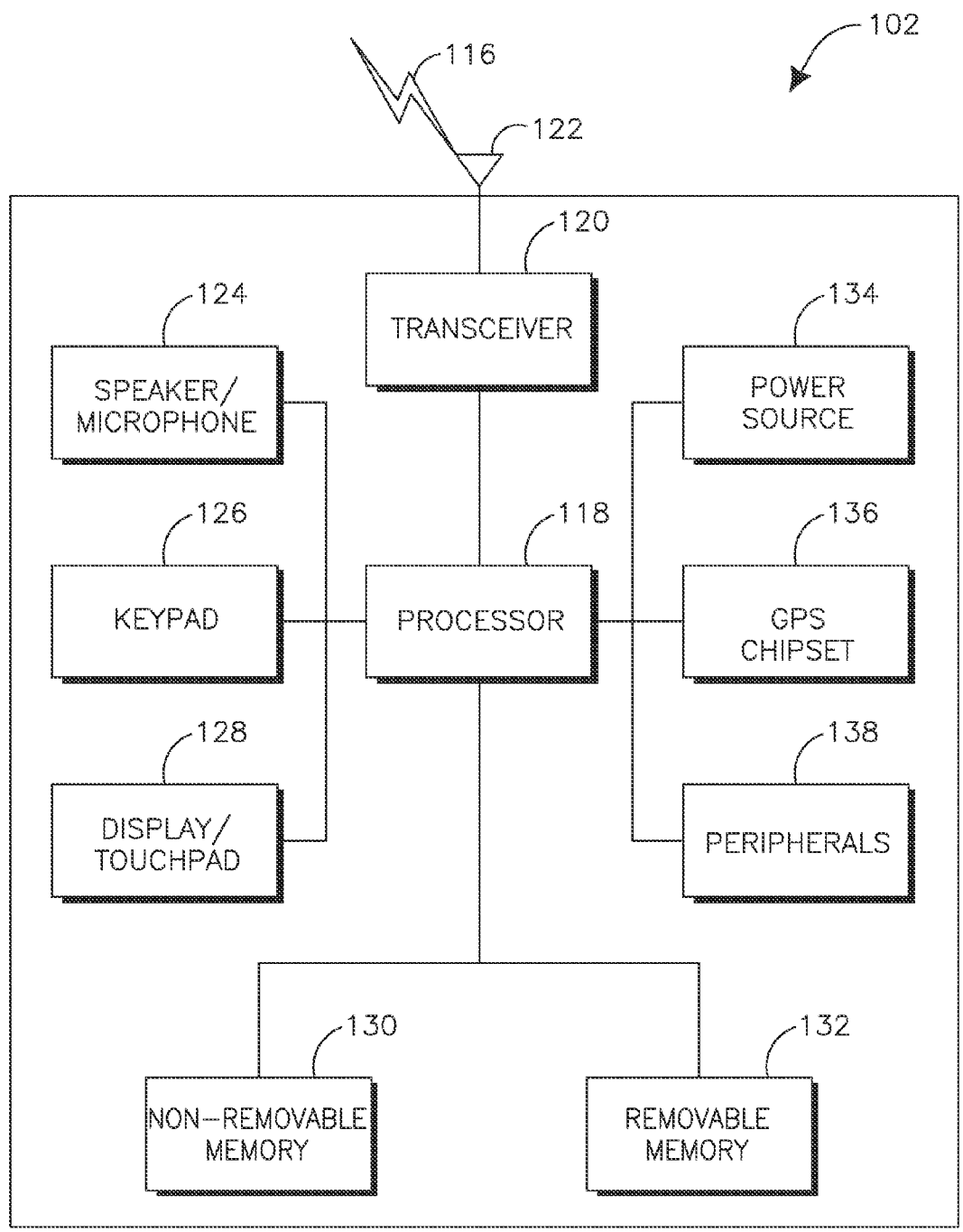
FIG. 1B shows an example wireless transmit/receive unit (WTRU) that may be used within the communications system shown in FIG. 1A.

FIG. 1B shows an example WTRU 102 that may be used within the communications system 100 shown in FIG. 1A. As shown in FIG. 1B, the WTRU 102 may include a processor 118, a transceiver 120, a transmit/receive element, (e.g., an antenna), 122, a speaker/microphone 124, a keypad 126, a display/touchpad 128, a non-removable memory 130, a removable memory 132, a power source 134, a global positioning system (GPS) chipset 136, and peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. The transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122, (e.g., multiple antennas), for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station, (e.g., base stations 114a, 114b), and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
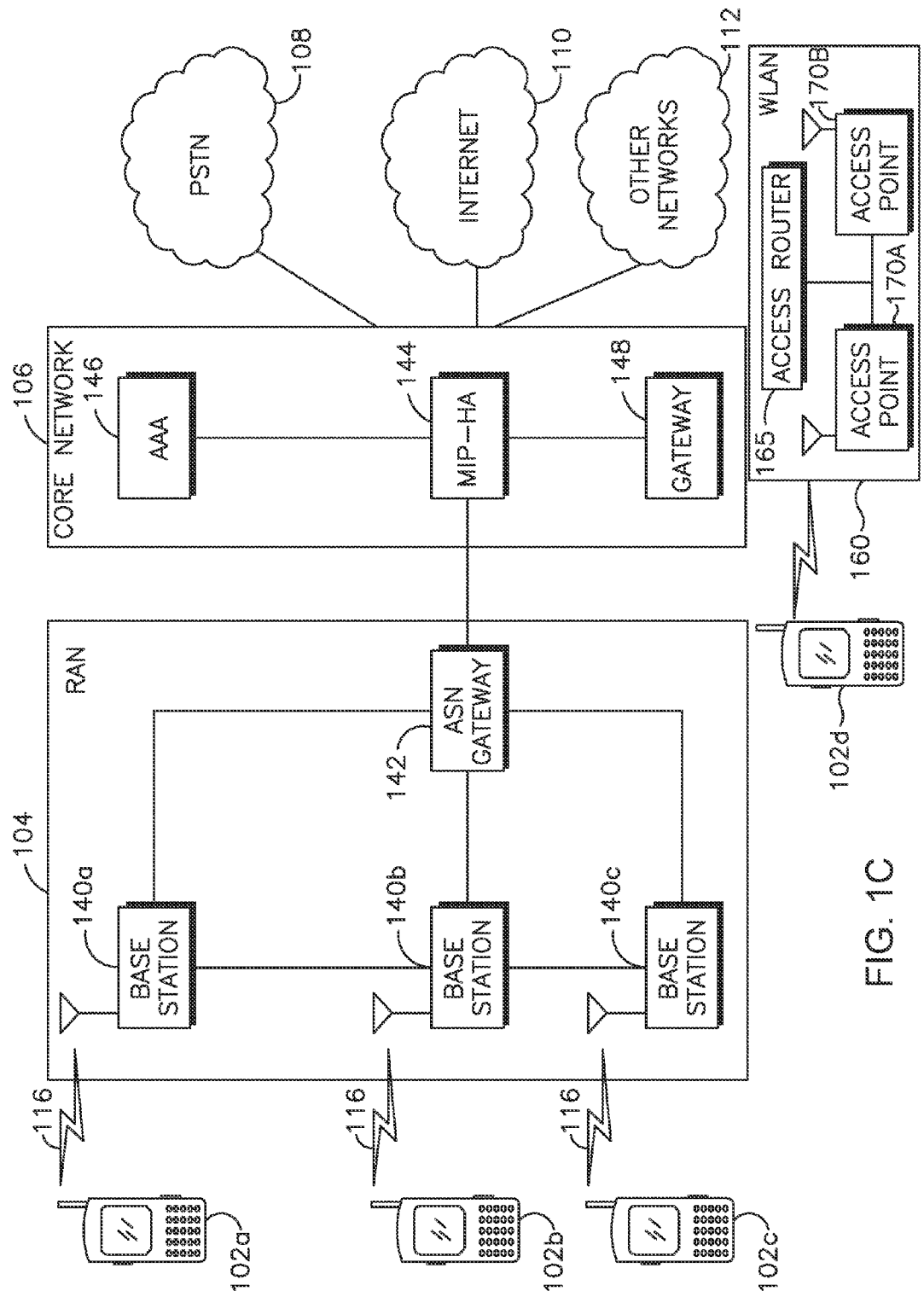
FIG. 1C shows an example radio access network and an example core network that may be used within the communications system shown in FIG. 1A.

FIG. 1C shows an example RAN 104 and an example core network 106 that may be used with the communications system 100 shown in FIG. 1A. The RAN 104 may be an access service network (ASN) that employs IEEE 802.16 radio technology to communicate with the WTRUs 102*a*, 102*b*, 102*c* over the air interface 116.

As shown in FIG. 1C, the RAN 104 may include base stations 140*a*, 140*b*, 140*c*, and an ASN gateway 142, though it will be appreciated that the RAN 104 may include any number of base stations and ASN gateways while remaining consistent with an embodiment. The base stations 140*a*, 140*b*, 140*c* may each be associated with a particular cell (not shown) in the RAN 104 and may each include one or more transceivers for communicating with the WTRUs 102*a*, 102*b*, 102*c* over the air interface 116. In one embodiment, the base stations 140*a*, 140*b*, 140*c* may implement MIMO technology. Thus, the base station 140*a*, for example, may use multiple antennas to transmit wireless signals to, and receive wireless signals from, the WTRU 102*a*. The base stations 140*a*, 140*b*, 140*c* may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102*a*, 102*b*, 102*c* and the RAN 104 may implement the IEEE 802.16 specification. In addition, each of the WTRUs 102*a*, 102*b*, 102*c* may establish a logical interface (not shown) with the core network 106. The logical interface between the WTRUs 102*a*, 102*b*, 102*c* and the core network 106 may be used for authentication, authorization, IP host configuration management, and/or mobility management.

The communication link between each of the base stations 140*a*, 140*b*, 140*c* may include protocols for facilitating WTRU handovers and the transfer of data between base stations. The communication link between the base stations 140*a*, 140*b*, 140*c* and the ASN gateway 142 may include protocols for facilitating mobility management based on mobility events associated with each of the WTRUs 102*a*, 102*b*, 102*c*.

As shown in FIG. 1C, the RAN 104 may be connected to the core network 106. The communication link between the RAN 104 and the core network 106 may include protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA 144 may be responsible for IP address management, and may enable the WTRUs 102*a*, 102*b*, 102*c* to roam between different ASNs and/or different core networks. The MIP-HA 144 may provide the WTRUs 102*a*, 102*b*, 102*c* with access to packet-switched networks, such as the Internet 110, to facilitate communications between the WTRUs 102*a*, 102*b*, 102*c* and IP-enabled devices. The AAA server 146 may be responsible for user authentication and for supporting user services. The gateway 148 may facilitate interworking with other networks. For example, the gateway 148 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. In addition, the gateway 148 may provide the WTRUs 102*a*, 102*b*, 102*c* with access to the networks 112, which may include other wired or wireless networks that are owned and/or operated by other service providers.

Although not shown in FIG. 1C, it will be appreciated that the RAN 104 may be connected to other ASNs and the core network 106 may be connected to other core networks. The communication link between the RAN 104 and the other ASNs may include protocols for coordinating the mobility of the WTRUs 102*a*, 102*b*, 102*c* between the RAN 104 and the other ASNs. The communication link between the core network 106 and the other core networks may include protocols for facilitating interworking between home core networks and visited core networks.

Other network 112 may further be connected to an IEEE 802.11 based wireless local area network (WLAN) 160. The WLAN 160 may include an access router 165. The access router 165 may contain gateway functionality. The access router 165 may be in communication with a plurality of access points (APs) 170*a*, 170*b*. The communication between access router 165 and APs 170*a*, 170*b* may be via wired Ethernet (IEEE 802.3 standards), or any type of wireless communication protocol. AP 170*a* may be in wireless communication over an air interface with WTRU 102*d*.

Representational state transfer (REST) is a software architecture style that may rely on a client-server based model. Clients may make requests to resources which are hosted on servers. A resource may be addressed via a uniform resource identifier (URI). Clients may use a simple and uniform set of commands (Create (POST), Retrieve (GET), Update (PUT) and Delete) to make requests to resources. The most successful and well-known deployments of REST may be the many web-based Internet applications and services that leverage the underlying RESTful hypertext transfer protocol (HTTP). REST may describe architectures that use HTTP or similar RESTful protocols, for example, the constrained application protocol (CoAP), by constraining the interface to a set of well-known, standard operations such as GET, POST, PUT, and DELETE. With REST, the focus is performing operations on resources in a stateless manner.

Simple object access protocol (SOAP) is a web services protocol that provides a basic remote procedure call (RPC)-like messaging framework upon which web services may be built. Natively, SOAP is non-RESTful in nature and carried over a transport such as transmission control protocol (TCP) or user datagram protocol (UDP). However, SOAP may alternatively be encapsulated and carried over a RESTful transport protocol like HTTP.

Figure 2:
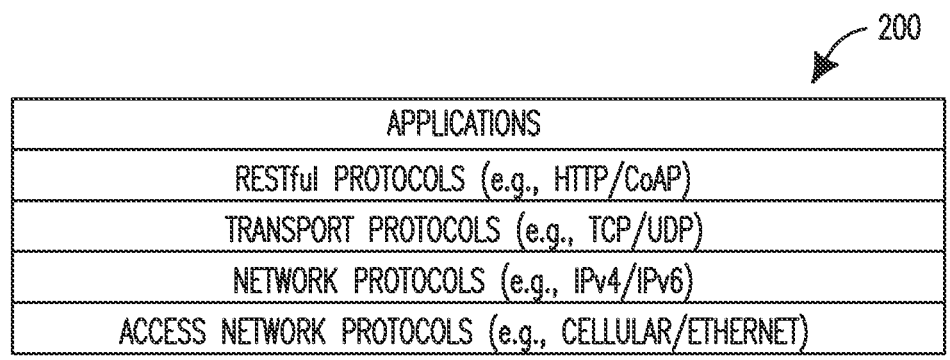
FIG. 2 shows an example of a RESTful protocol stack.

FIG. 2 shows an example of a RESTful protocol stack 200. REST is a software architecture style that may rely on a client-server based model. Clients may make request to resources which are hosted on servers. Clients may use a simple and uniform set of commands to make requests to resources.

Figure 3:
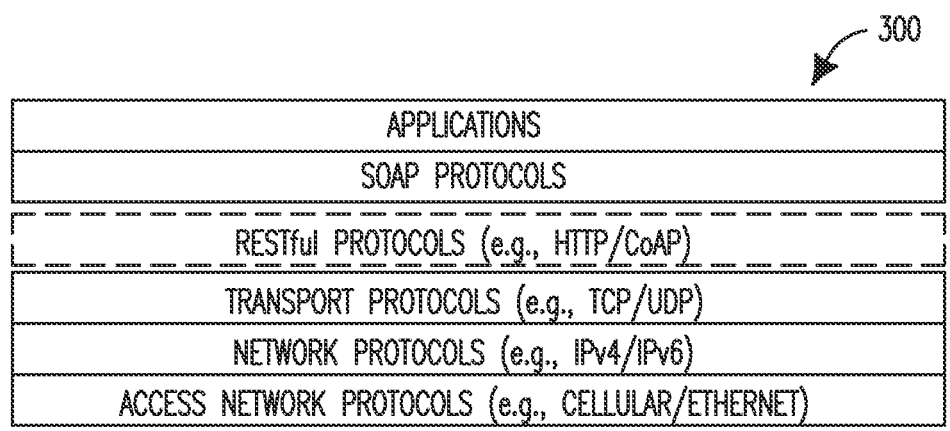
FIG. 3 shows an example of a simple object access protocol (SOAP) stack.

FIG. 3 shows an example of a SOAP stack 300. SOAP is a web services protocol that may provide a basic RPC-like messaging framework upon which web services can be built. SOAP may be non-RESTful in nature and carried over a transport such as TCP or UDP. SOAP may be encapsulated and carried over a RESTful transport protocol like HTTP. SOAP may be extensible markup language (XML)-based and may consist of three parts: an envelope, which defines what is in the message and how to process it; a set of encoding rules for expressing instances of application-defined data types; and a convention for representing procedure calls and responses.

Recently focus and attention has been given to enhancing the architecture and protocols of the Internet to support future Internet of Things (IoT) devices, such as sensors and actuators. For example, 6LoWPAN is a version of the IPv6 networking protocol suitable for IoT devices. Likewise, Routing Protocol for Low-Power and Lossy Networks (RPL) is an IPv6 routing protocol suitable for IoT devices. And, finally CoAP is a RESTful application/transport protocol suitable for IoT devices.

The next step towards the future IoT may be for IoT-type devices to migrate towards a more service oriented architecture and offer their functionality via services. Likewise, future IoT networks may also migrate towards a more service oriented architecture and host network-based services upon network nodes such as cloud servers, gateways, routers, and the like, to assist and enable IoT devices and applications to interact with one another in a more intelligent and efficient manner.

Coupled with this migration to a more services based architecture, future IoT networks may also migrate towards becoming more information centric and aware. Unlike messages that flow through today's networks, future IoT messages may also contain higher-level forms of information that may be made accessible and interpretable, not just to endpoint applications, but also to network-based services, for example, web services, hosted on intermediate nodes in the network as well. For example, information such as metadata which describes the data and may be used to interpret the data (i.e., semantics), or context information such as where data originated from, or policy information which define rules related to information in the message. Standardization of mechanisms to support such higher-level forms of information is already underway. For example, the Semantic Web effort in the W3C is one such effort.

Figure 4:
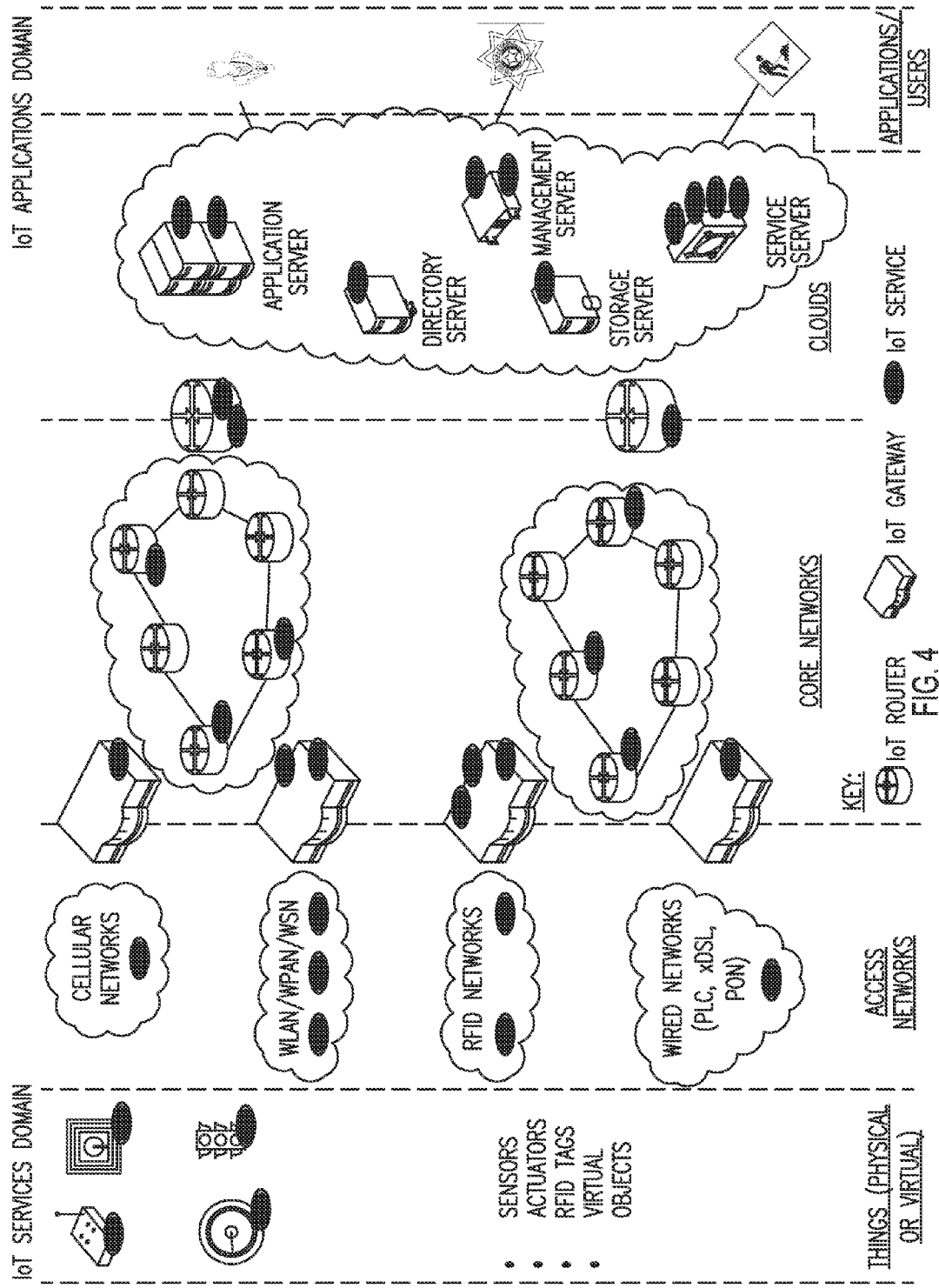

These higher-level forms of information may enable more intelligent services to be defined and deployed on IoT devices as well as on IoT network nodes, for example, routers, servers, and the like. FIG. 4 shows an example of the types of network nodes and devices that IoT services may be deployed on. These services may support performing value-added and intelligent operations by leveraging this higher-level information. By leveraging the awareness of these higher-level forms of information, existing traditional web services may evolve into more intelligent services, for example, IoT services.

To fully enable and unleash the full potential of these new more intelligent IoT services however, more intelligent and standardized IoT service interfaces may be needed for widespread adoption and efficient use of IoT services by IoT applications, IoT devices, and other IoT services. For example, these IoT service interfaces may support awareness of higher-level forms of information and in turn support protocols that perform more intelligent operations on these higher-level forms of information than existing network protocols. For example, an intelligent IoT service interface protocol supporting awareness, collaboration and exchange of higher level information such as content, context, policies, decisions, events, and the like may be needed. In addition, through standardization of these intelligent IoT service interfaces, the widespread adoption and use of these services may be enabled.

Figure 5:
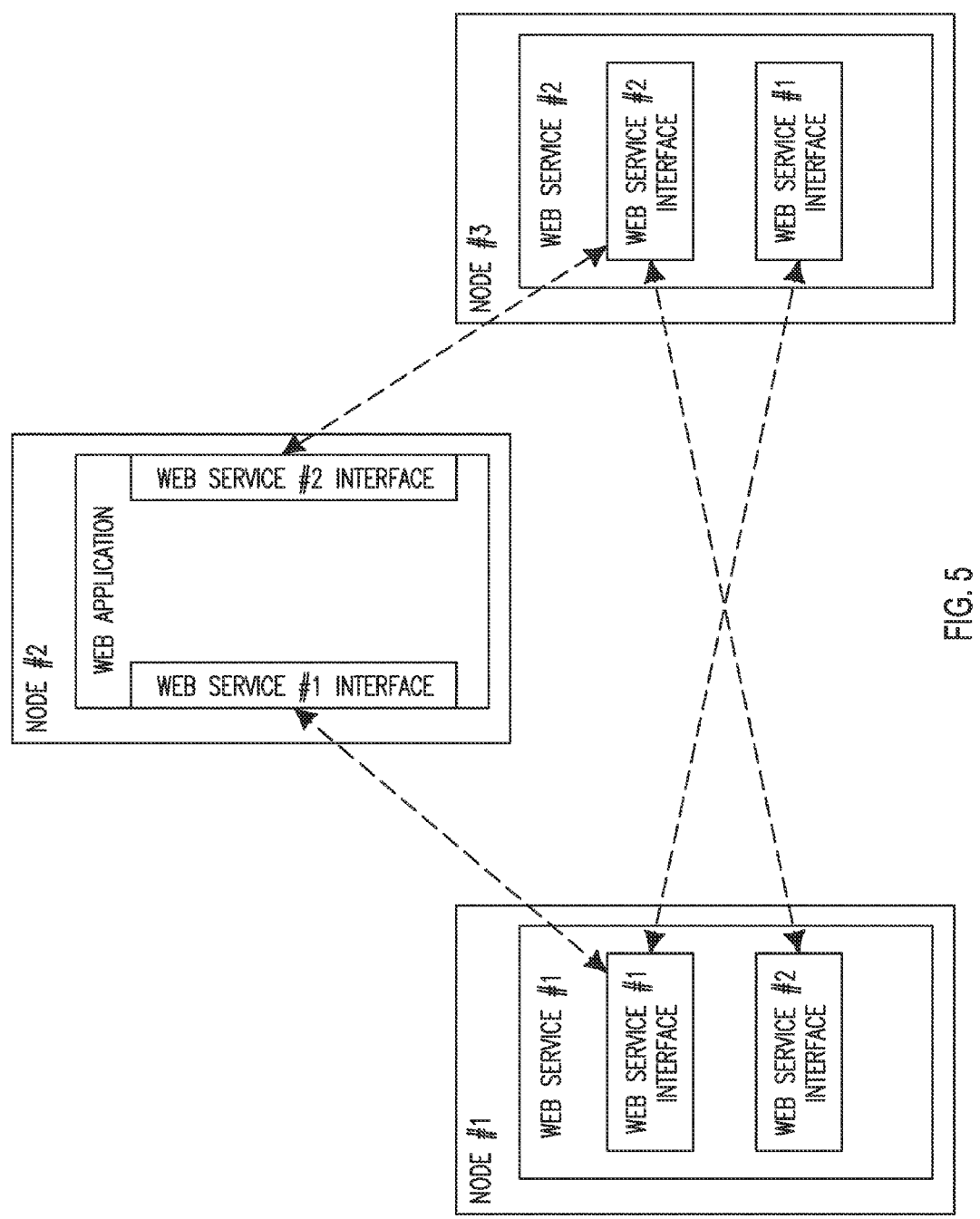
FIG. 5 shows an example of interfacing to web services.

FIG. 5 shows an example of interfacing to web services. This may add complexity to the application since applications are burdened with implementing and supporting the interface logic necessary to communicate with each specific web service they interface to. In addition, the maintenance cost of applications may be increased, since applications need to be updated each time a web service interface they use is modified. These same problems may also apply to web services that interface to other web services.

Some recent technology advancements have been made to help standardize web service interfaces, although they may not fully address the above problem. For example, Web services description language (WSDL) may be used by a SOAP-based web service to define a set of supported service interface procedures and parameters. Likewise, Web Linking may be used by a RESTful based web service to define a set of supported service interface resources as well as define semantics or metadata that describe each of these resources. These mechanisms may in turn be used by a web application to discover a web service interface. However, the key problem may still exist; the web service interface that is discovered may still be non-standardized and proprietary in nature since the procedures and resources supported by these web services may be specific to that particular web service. Hence web applications (and other web services) are limited to interfacing to web services which they have been specifically developed and understand how to use. In addition web applications and web services may still be burdened with supporting the interface logic necessary to interface to communicate with each of the web services.

The problem of proprietary web service interfaces has been acknowledged by industry and technical experts alike, and as a result some work has begun to try and address this specific problem. The main approach may be to try and define 'open' or standardized web service APIs. The goal of these APIs may be to define an open/standardized set of web service interface procedures or resources which web application and service developers may design their interfaces to, such that they are interoperable. The most prevalent approaches that have been taken may be to design these APIs over top of SOAP or REST protocols. The web service APIs developed to date however have not gained widespread adoption for various reasons. In the case of one API, it may be a web service API targeted towards a particular niche of web services and applications (i.e. mobile/cellular network web services and applications) and hence is not broadly applicable to other web services. In the case of W3C APIs, these APIs are in the early stages of development/standardization, and may define a separate API for each type/class or web service; for example, API for web database services, API for web storage services, API for web file system services, and the like. It may be too early to tell whether this approach may be successfully adopted by the industry or not, but one concern with this approach is the sheer number of different APIs that may be required for the different types of web services; especially given the anticipated evolution of web services to more intelligent IoT services, and the likelihood of an expected increase in the number of IoT service types by one or more orders of magnitude. Hence, the scalability and viability of defining a new IoT service API for each type of IoT service that comes along may be questionable.

To address the challenge of standardizing IoT service interfaces, an alternative approach may be presented. Rather than defining open/standardized web service APIs, a method and apparatus to support a standardizable IoT service interface protocol may be presented. One motivation for defining an IoT service interface protocol may be to offload overhead and burden of interfacing to IoT services from applications/services into a protocol layer. In doing so, IoT services and application implementations may be streamlined and development costs, complexity and maintenance may be reduced. Another motivation may be to define a protocol that supports a higher-level of abstraction and awareness of IoT information, for example, semantics, context, policies, events, and the like, compared to existing protocols. In doing so, the IoT service interface protocol may natively support more intelligent service interface operations and primitives such as those described herein. Without such a protocol, the service interface operations and primitives may instead be bound to existing lower-level protocols, for example, SOAP, HTTP, and the like, by the application/service. This may require the application/service to split-up each service interface operation into multiple lower level operations, for example, RESTful Create, Retrieve, Update and Delete operations. Since this splitting up may be performed by the application/service it may add extra complexity and overhead to it and may result in the similar problems described above. In contrast, using an IoT service interface protocol may enable IoT applications and services to communicate with one another at a higher-level of abstraction and in a more intelligent and efficient manner.

Figure 6:
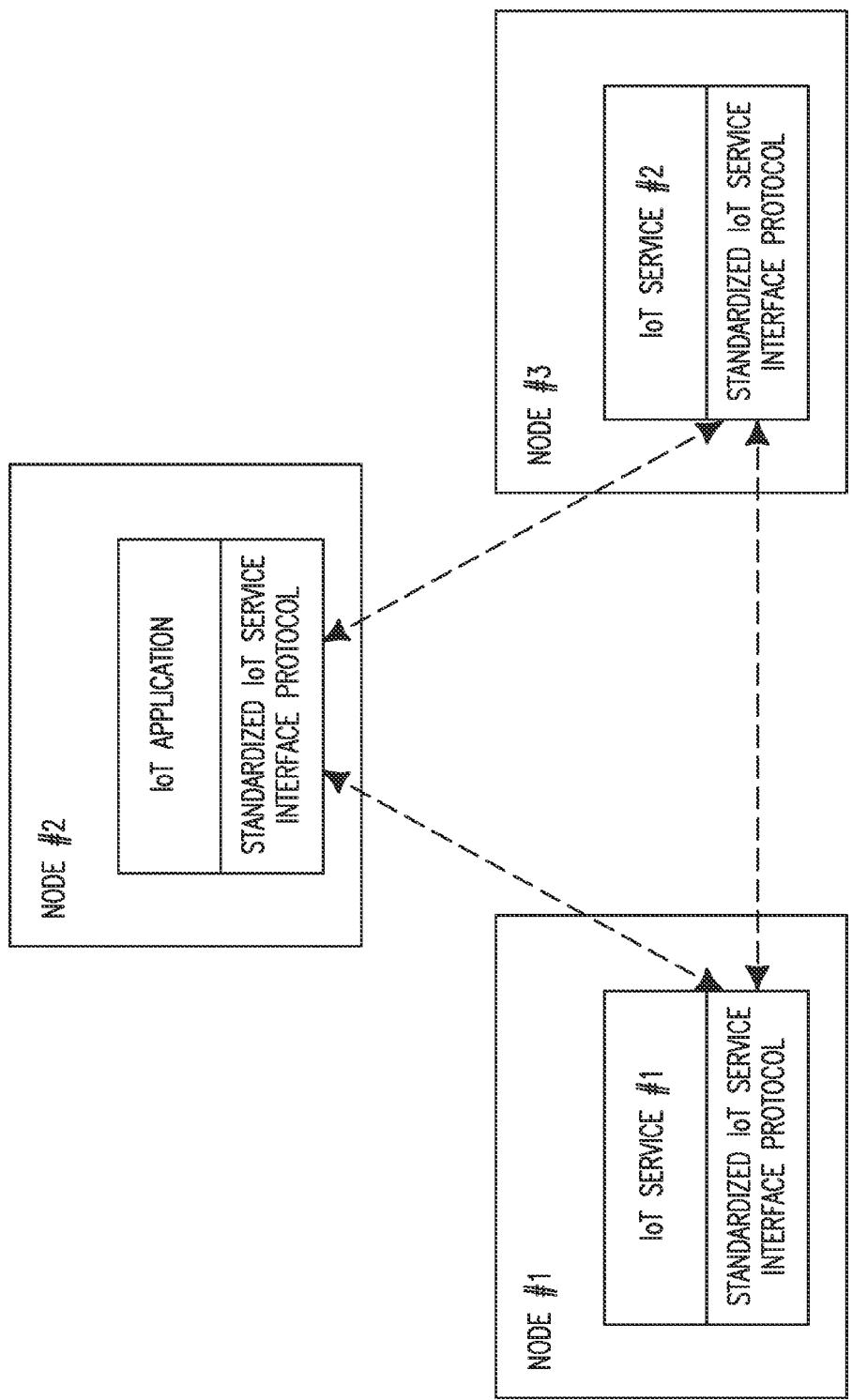
FIG. 6 shows an example of a standardized IoT service interface protocol.

FIG. 6 shows an example of a standardized IoT service interface protocol. The IoT services hosted upon each node may communicate with one another over standardized IoT service interfaces. In actual system deployments, the generic nodes may be IoT devices, cloud servers, gateways or routers, as shown in FIG. 4.

Specifically, the following methods and apparatus of the IoT service interface protocol may be defined: an extensible set of foundational service interface operations having broad applicability to all different types of IoT services; an extensible set of service interface primitives that define the fundamental communication elements of the IoT service interface; and an example that may bind the service interface operations and primitives to a proposed IoT service interface protocol. Protocol may define IoT service interface messaging and proxying functionality. Although the IoT service interface protocol is described in the context of IoT, the interface may also apply to traditional web services as well as other service oriented networks as well.

A broad and extensible set of smart IoT service interface operations may be described. The set of defined operations is not meant to be exhaustive. Rather, the operations defined may be those that are thought to be a likely set of common operations applicable to a broad set of intelligent IoT services and hence good candidates for support within an IoT service interface protocol. New operations may be defined as new IoT use-cases warrant them.

The service interface operations may be defined in terms of a broad set of actions, for example, publish, collect, compose, spawn, and the like, that are performed upon smart IoT IEs. The broadness of the actions may enable the operations to be applicable across a broad set of industry verticals, for example, healthcare, building automation, and the like, and in turn a broad set of corresponding types of IoT services. The motivation for defining the operations in terms of actions that may be performed on smart IoT IEs is based on the vision that the future IoT may be highly information centric and aware as evidenced by the work that has already been started by the Semantic Web activity. The IEs of the future IoT may contain higher-level information such as semantics, context, policies, events, and the like. Awareness of this higher-level information may fuel and enable the definition of higher-level information-aware services along with the need for higher levels of abstraction and intelligence when interfacing to these IoT services.

These service interface operations may enable IoT services and applications to make requests to one another and may perform intelligent operations on designated IEs on each other's behalf at a high-level of abstraction and intelligence. For example, one IoT service may request another IoT service to aggregate separate instances of content into one instance, or an IoT device application may request an IoT network service to delegate and service transactions on its behalf, and the like.

To support even higher levels of abstraction and efficiency on the service interface, service level operations may be layered on top of one another. In doing so, even higher-level, more efficient, and more intelligent service interface operations may be realized by having one service interface operation trigger multiple service level sub-operations. For example, compose may consist of collect, aggregate and/or concatenate sub-operations.

FIG. 7 shows a list of smart IoT service interface operations, applicable service interface sub-operations, and examples of applicable IoT IEs. For each service level operation listed in FIG. 7, a set of corresponding service level operations that may be batched together and used as sub-operations is provided, for example, in the third column. Batching together of operations may not be a requirement but rather an optional proposed enhancement for the service interface. Alternatively, service level operations may be kept separate.

For each operation listed in FIG. 7, the corresponding examples of applicable IEs demonstrate the types of applicable IEs that the operation may be performed upon. A particular instance of a deployed IoT service interface may either support all the defined operations, a subset of the defined operations, for example, depending on its use-case requirements, or additional operations if required.

CONNECT may be used to establish a service level connection/session between two or more IoT services and/or applications. Inputs may be a list of service or application descriptor IEs to connect as well as an optional list of IEs to factor into connecting, for example, policies, context, events, and the like. Output may be status indicating whether the connection was successful or not as well connection information such as session information and/or a session ID. Not all communication between services or applications may warrant a communication session. For example, for short message transmission, session-less may be more applicable to minimize overhead, which may likely be applicable for many IoT use cases.

DISCONNECT may be used to tear down a service level connection/session between two or more services or applications. Inputs may be a list of service or application descriptor IEs describing which services or applications to disconnect as well as a list of IEs to factor in when disconnecting, for example, policies, context, events, and the like. Output may be status indicating whether the service disconnection was successful or not.

PUBLISH may be used to advertise IoT IEs to one or more peer applications or services. Services may also PUBLISH to a designated discovery service within a network. For example, a service may increase the awareness of the services it supports by publishing this information to other services. Other services may in turn forward this information to the services and applications they interact with. Input may be a list of one or more IEs as well as an optional list of IEs to factor into publishing, for example, policies, context, events, and the like. Output may be a status of whether elements were successfully published or not and context such as location(s) of where the elements were published, which may be used for un-publishing.

UN-PUBLISH may be used to delete published IoT IEs, for example, on one or more nodes hosting a discovery service, and the like. Input may be a list of published IEs. An optional list of IEs may also be included to factor into un-publishing, for example, policies, context, events, and the like. Output may be a status of whether elements where successfully un-published or not.

To coordinate more optimal publishing/un-publishing of IEs the PUBLISH/UN-PUBLISH operations may be paired with the COLLABORATE, SHARE and SYNCHRONIZE operations. For example, to coordinate sharing and synchronizing of published IEs between collaboration partners and broaden the discoverability of the elements. PUBLISH/UN-PUBLISH may be triggered under different circumstances, for example, periodically or one-time triggering by an event or a policy. For cases where published IEs are shared, for example, via COLLABORATE or SHARE, un-publishing of these IEs may be handled in several different ways. For example, un-publishing may be the responsibility of the original publisher in which case anytime a published IE is shared, the original publisher is updated with information regarding who the IE has been shared with, so it may un-publish the share IE itself. Alternatively, un-publishing may be the responsibility of the application/service which shared the published IE, for example, application/service may un-publish any published IE it has shared if/when its local published IE is un-published by the original publisher.

DISCOVER may be used to find IoT IEs, for example, discovery, of interest, for example, by querying one or more discovery services, and the like. Inputs may be query conditions such as an identifier of a targeted discovery service or a query string as well as an optional list of IEs to factor into discovery, for example, policies, context, events, and the like. Discovery requests may also be more high-level and abstract in nature, for example, discover a temperature sensor in Philadelphia, which a discovery service could interpret and form lower-level IE discovery queries from. Output may be a list of IE identifiers (if any) matching the input query conditions.

To coordinate more optimal discovery of IEs, the DISCOVERY operation may be paired with the COLLABORATE operation. For example, DISCOVER requests may be forwarded amongst services and/or applications which have pre-established themselves as collaboration partners via the COLLABORATE operation. This may increase the scope and reach of DISCOVERY requests.

ASSOCIATE may be used to establish a relationship, for example, secure session, peer service relationship, and the like, with one or more IoT applications or services by exchanging necessary information, for example, capabilities, contact information, security credentials, and the like. Relationship may be one-to-one, one-to-many, many-to-one, or many-to-many. Input may be a list of service or application descriptor IEs to associate with as well as an optional list of IEs to factor into associating, for example, policies, context, events, and the like. Output may be status indicating whether association was successful or not and the corresponding reason. Output may include an association ID and a description of the association and where the description is located, for example, association context information.

DE-ASSOCIATE may be used to tear down existing relationships between one or more IoT applications or services. Input may be a list of service application descriptor IEs to de-associate with. An optional list of IEs may also be included to factor into de-associating, for example, policies, context, events, and the like. Output may be status indicating whether de-association was successful or not and the corresponding reason. The ASSOCIATE operation may also be paired with the DISCOVER operation to first find services and applications of interest before associating with them.

COLLECT may be used to gather IoT IEs into a collection such that operations may be collectively performed upon the collection. For example, a service may collect IEs from another service which meets a certain policy criteria, for example, context of a certain type. Input may be a list of IEs to collect as well as an optional list of IEs to factor into collecting, for example, policies, context, events, and the like. Output may be status indicating whether collection was successful along with identifier of where the collection was created. Before collecting IEs from another service or application, an ASSOCIATE and DISCOVER may also be used.

COMPOSE may be used to create one or more IoT IEs or IoT services. For example, COMPOSE may be used to create a policy to only initiate communication during the hours of 2 and 3 am since this is when the node upon which the service is hosted is awake. Input may be a list of IEs to create that includes the individual set of attributes required for each element as well as an optional list of IEs to factor into composing, for example, policies, context, events, and the like. Output may be status indicating whether element(s) were successfully created along with identifier(s) of where the element(s) were created.

DE-COMPOSE may be used to remove one or more IoT IEs or services hosted by one or more IoT nodes, services or applications. Input may be a list of IEs to remove. An optional list of IEs may also be included to factor into de-composing, for example, policies, context, events, and the like. Output may be status indicating whether element(s) were successfully removed. Before removing an IE on another service or application, an ASSOCIATE may first be required.

The COLLECT, AGGREGATE and/or CONCATENATE operations may also be used to complement the COMPOSE operation. For example, a sequence of operations may be used to first collect multiple content IEs and then concatenate or aggregate them together, and may then finally compose a new content IE.

SUBSCRIBE may be used to create a subscription to an IoT IE, collection of IoT IEs, or IoT service in order to receive notifications, for example, if/when elements are modified. Input may be a list of IEs to subscribe to and a set of criteria for when notifications are desired as well as an optional list of IEs to factor into subscribing, for example, policies, context, events, and the like. Output may be a status indicating whether subscription was successful or not as well as a subscription ID and/or location of the subscription information.

UN-SUBSCRIBE may be used to remove a subscription to an IoT IE, collection of IoT IEs, or IoT service to stop receiving notifications. Input may be a list of IEs to un-subscribe from containing information such as subscription ID or location of the subscription information. An optional list of IEs may also be included to factor into un-subscribing, for example, policies, context, events, and the like. Output may be status indicating whether removal of subscription was successful or not.

NOTIFY may be used to send notification(s) to subscriber(s). Input may be a list of applications or services to send notification to and the notification itself including information such as a subscription ID and/or location of the subscription information. Output may be status indicating whether notification was successful or not.

The COLLECT operation may also be used to further complement the SUBSCRIBE operation. For example, a collection of IEs may first be created and may then subscribed to.

CONCATENATE may be used to create a new IoT IE by concatenating together multiple IEs, for example, create a more advanced IE. Input may be a list of IEs to concatenate as well as an optional list of IEs to factor into concatenating, for example, policies, context, events, and the like. Output may be status indicating whether concatenation was successful along with identifier of where the new concatenated element was created.

DE-CONCATENATE may be used to de-concatenate a concatenated IE into individual IEs. Input may be a list specifying the types and order of IEs contained in the concatenated element. An optional list of IEs may also be included to factor into de-concatenation, for example, policies, context, events, and the like. Output may be a status indicating whether de-concatenation was successful along with a list of identifiers indicating where the new de-concatenated elements were created.

The COLLECT operation may also be used to further complement the CONCATENATE operation. For example, a collection of IEs may first be created and may then concatenated with one another (i.e., COLLECT and CONCATENATE the three pieces of information such as time, temperature and humidity each hosted on different nodes in the network and generated by different services on these nodes).

AGGREGATE may be used to create new IoT IEs or services by combining together other IEs or services, for example, create a more advanced IE. Input may be a list of IEs or service descriptors to aggregate as well as list of IEs defining the type of aggregation to perform as well as criteria for performing the aggregation, for example, policies, context, and the like. Output may be status indicating whether aggregation was successful along with an identifier of where the new aggregated element was created.

The COLLECT operation may also be used to further complement the AGGREGATE operation. For example, a collection of IEs may first be created and then aggregated with one another.

SHARE may be used to share a copy of an IE, collection of IEs, or services with one or more IoT applications or services. For example, unicast (from one Service to another Service), multicast (from one Service to a group of other Services), broadcast (from one Service to all relevant other Services), and convergecast (from multiple Services to a single Service). Input may be a list of identifiers of IoT applications or services to share elements with along with a list of identifiers of the elements or descriptors of services to share. An optional list of IEs may also be included to factor into sharing, for example, policies, context, events, and the like. Output may be status indicating whether the sharing was successful or not.

The COLLECT operation may also be used to further complement the SHARE operation. For example, a collection of IEs may first be created and then shared.

RELOCATE may be used to move an IE, collection of IEs or a service from one IoT node, application or service to one or more others. For example, a service may re-locate IEs to another service and in turn another node. This operation may be useful to move IEs to a location in the network that is closer to the clients that are using the IEs. Input may be a list of identifiers or descriptors that an IoT application or service may use to re-locate elements to, along with a list of the identifiers of the elements or descriptors of services to re-locate. An optional list of IEs may also be included to factor into relocating, for example, policies, context, events, and the like. Output may be status indicating whether the relocation was successful or not.

The COLLECT operation may also be used to further complement the RELOCATE operation. For example, a collection of IEs may first be created and then relocated.

SYNCHRONIZE may be used to update shared copies of an IE on one or more IoT applications or services to synchronize them and make sure they are consistent with one another. Input may be a list of identifiers of IoT applications or services to synchronize with along with an identifier of the element to synchronize. An optional list of IEs may also be included to factor into synchronizing, for example, policies, context, events, and the like. Output may be status indicating whether the synchronization was successful or not. Before synchronizing IEs, the SHARE operation may also be used to share the elements across one or more IoT applications or services.

REVOKE may be used to take back a shared or relocated IE, collection of IEs or services from one or more IoT applications or services. Input may be a list of identifiers of re-located or shared elements or descriptors of shared services. A list of IEs may also be included to factor into revoking, for example, policies, context, events, and the like. Output may be status indicating whether the revocation was successful or not.

The SYNCHRONIZE operation may also be used to further complement the REVOKE operation. For example, before revoking an IE, a synchronization operation may be used to retrieve any updates made to an IE.

DELEGATE may used to appoint one or more IoT applications or services to service requests on one's behalf, for example, a proxy, or to serve as the lead/head of a collection. Input may be a list of identifiers of IoT applications or services to appoint along with service and application descriptor IEs detailing the type of delegation requested. An optional list of IEs may also be included to factor into delegating, for example, policies, context, events, and the like. Output may be status indicating whether the delegation was successful or not as well as a delegation ID and/or additional context information.

The RELOCATE operation may be used to further complement the DELEGATE operation. For example, IEs may be relocated to a delegate to better enable it to perform its delegation duties, such as transfer IEs.

SURROGATE may be used to replicate IoT applications or services, including IEs they host, to increase network scalability and performance, for example, replicate services closer to the edge of the network and closer to clients. Input maybe a list of identifiers of IoT applications or services to surrogate to, along with service or application descriptor IEs detailing the type of requests to be surrogated. Output may be status indicating whether the surrogate request was successful or not as well as a surrogate ID and/or additional context information. SHARE and SYNCHRONIZE may also be leveraged as sub-procedures.

The SHARE operation may be used to further complement the SURROGATE operation. For example, IEs may be shared with a surrogate to better enable it to perform its surrogate duties.

RELIEVE may be used to relieve one or more IoT applications or services of their delegate or surrogate duties. Input may be a list of identifiers of IoT applications or services acting as delegates or surrogates, for example, delegate and/or surrogate ID. An optional list of IEs may also be included to factor into relieving, for example, policies, context, events, and the like. Output may be status indicating whether the relieve request was successful or not.

The SYNCHRONIZE operation may be used to further complement the RELIEVE operation. For example, IEs may be synchronized back to an originating Application or service before it relieves a delegate or surrogate of its duties.

INVOKE may be used to call upon a targeted Service to execute a desired function on one or more specified IEs. For example, a service may invoke the services hosted by another service to have it perform some desired functionality. This may involve passing IEs between the services and performing operations on these elements. Inputs may be an identifier to a targeted Service and a list of IEs to be processed by the service. An optional list of IEs may also be included to factor into invoking, for example, policies, context, events, and the like. Referenced IEs may be fetched, processed, and results stored by targeted service. Outputs may be status along with a list of identifiers of where the processed elements have been stored by the Service. Before invoking a service, ASSOCIATE and DISCOVER operations may first be required.

INTERPRET may be used to call upon an IoT service to interpret one or more specified IEs, for example, converting/translating an IE from one format to another defined format which the requesting service or application can comprehend. Inputs may be an identifier to a targeted service and a list of IEs to be processed by the service. An optional list of IEs may also be included to factor into interpreting, for example, policies, context, events, and the like. Outputs may be status along with a list of interpreted elements. To call upon a service to perform an INTERPRET operation, the INVOKE operation may be used as an underlying sub-operation.

ANNOTATE may be used to call upon an IoT service to enrich one or more specified IEs with specified information. Inputs may be an identifier to a targeted service and a list of IEs to be processed by the service. An optional list of IEs may also be included to factor into annotating, for example, policies, context, events, and the like. Outputs may be status along with a list of annotated elements. To call upon a service to perform an ANNOTATE operation, the INVOKE operation may be used as an underlying sub-operation.

EXTRACT may be used to call upon one or more IoT service(s) to mine information from one or more specified IEs, hosted on one or more nodes in the network. Inputs may be an identifier to a targeted service(s) and a list of IEs to be processed by the service(s). An optional list of IEs may also be included to factor into extracting, for example, policies, context, events, and the like. Outputs may be status along with a list of extracted elements. To call upon a service to perform an EXTRACT operation, the INVOKE operation may also be used as an underlying sub-operation.

SPAWN COLLABORATION may be used to call upon an IoT service to spawn collaboration based on inputs such as collaboration type, list of collaborators (IoT applications, Services and/or Entities). An optional list of IEs may also be included to factor into spawning, for example, policies, context, events, and the like. Output may be a status indicating whether desired collaboration was spawned successfully or not as well as a collaboration ID.

CEASE COLLABORATION may be used to call upon an IoT service to cease collaboration. Input may be a list of collaborators (IoT applications or services) and collaboration IDs. An optional list of IEs may also be included to factor into ceasing collaboration, for example, policies, context, events, and the like. Output may be a status indicating whether desired collaboration was ceased successfully or not. To call upon a service to perform a SPAWN/CEASE COLLABORATION operation, the INVOKE operation may also be used as an underlying sub-operation.

DECIDE may be used to call upon an IoT service to make a decision based on specified IE inputs such as content, policies, context, events, and the like. An optional list of IEs may also be included to factor into decision making, for example, policies, context, events, and the like. Output may be one or more decision IEs. The type of decision(s) a service makes may be based on the type of decision-making capability(s) it supports. This information may be discovered in advance by a requester before calling upon the service, for example, using the DISCOVER operation. To call upon a service to perform a DECIDE operation, the INVOKE operation may also be used as an underlying sub-operation.

ADAPT may be used to call upon an IoT service to adapt and/or transform specified IEs. Inputs may be a list of IEs to adapt and a list of IEs to factor in when performing the adaptation, for example, policies, context, events, and the like. Output may be adapted IEs. The type of adaptation(s) a service performs may be based on the type of adaption capability(s) it supports. This information may be discovered in advance by a requester before calling upon the service, for example, using the DISCOVER operation. To call upon a service to perform an ADAPT operation, the INVOKE operation may also be used as an underlying sub-operation.

VIRTUALIZE may be used to invoke an IoT service to virtualize an informational element, a node, a service, or even a sensor network. Inputs may be a list of what to virtualize and a list of IEs to factor in when performing the virtualization, for example, policies, context, events, and the like. Output may be status indicating whether the virtualization was successful or not as well as a list of newly virtualized resources.

DE-VIRTUALIZE may be used to invoke an IoT service to de-virtualize informational element, a node, a service or even a sensor network. De-virtualization may consist of clean-up of any virtual resources. Inputs may be a list of what to de-virtualize. An optional list of IEs may also be included to factor into de-virtualizing, for example, policies, context, events, and the like. Output may be status indicating whether the de-virtualization was successful or not. DISMISS, REVOKE and SYNCHRONIZE may also be leveraged as sub-procedures for DE-VIRTUALIZE. To call upon a service to perform a VIRTUALIZE/DE-VIRTUALIZE operation, the INVOKE operation may also be used as an underlying sub-operation. In addition, the DELEGATE and/or SURROGATE operations may also be leveraged as sub-operations for the VIRTUALIZE operation. Likewise, the RELIEVE and REVOKE operations may also be leveraged as sub-operations for the DE-VIRTUALIZE operation.

FIG. 8 shows IoT fields and corresponding service interface request primitive descriptions. FIG. 9 shows IoT fields and corresponding service interface response primitive descriptions. These primitives may define the fundamental communication elements of the proposed service interface, and may be extensible in that additional primitives and/or fields within these primitive may be added as more use cases evolve. The logical IoT service interface primitives may be defined independently of any service interface protocol messages to allow flexible binding and portability of the interface primitives to as many new and/or existing service interface protocols as possible.

Figure 10:
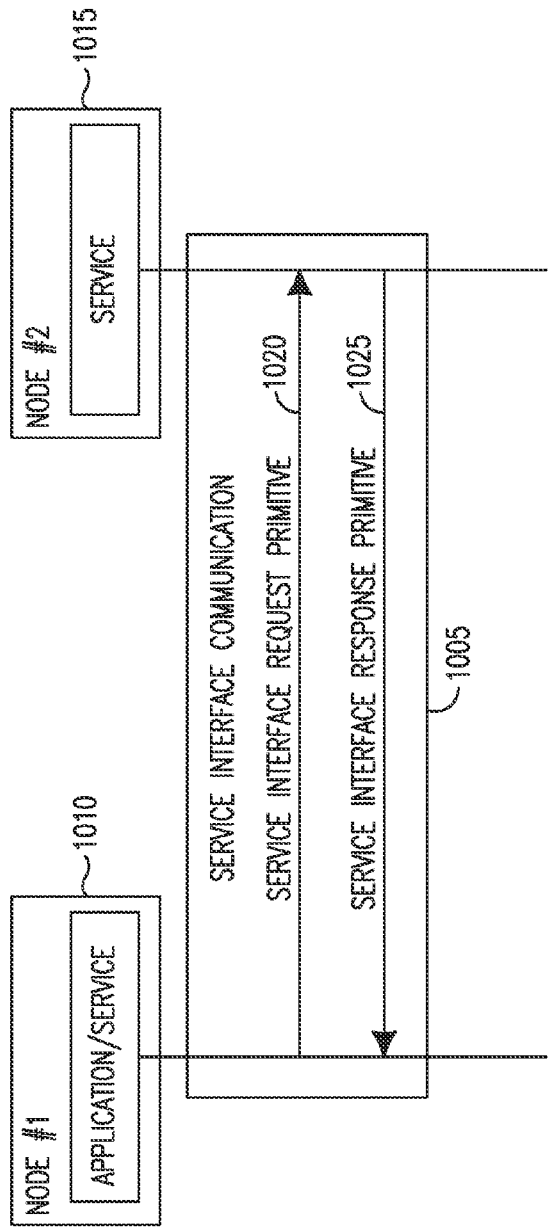
FIG. 10 shows an example of a service interface request/response primitive exchange.

FIG. 10 shows an example of a service interface request/response primitive exchange. As shown in FIG. 10, the primitives support may be bound to a service interface 1005 for communication between applications and services hosted on different nodes 1010 and 1015, whereby in this example, node 1010 may send a service interface request primitive 1020 to node 1015, and node 1010 may receive a service interface response primitive 1025 from node 1015.

Figure 11:
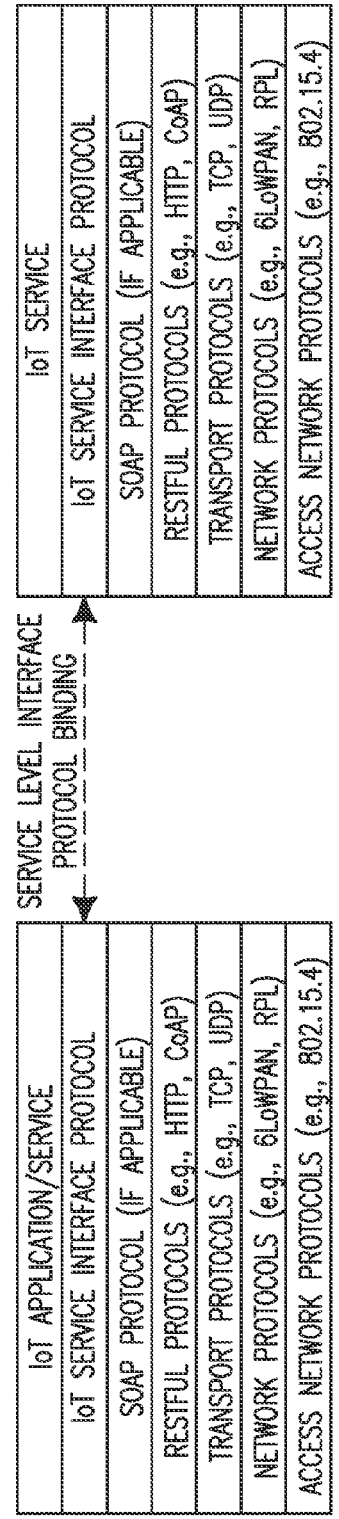
FIG. 11 shows an example of categories an example IoT service interface.

FIG. 11 shows an example of categories of an example IoT service interface. An example for binding the IoT service interface primitives and operations to a proposed IoT service interface protocol is shown in FIG. 11.

The motivation and justification for introducing a new IoT service interface protocol layer may be to define a protocol that supports a higher-level of abstraction and awareness of IoT service interface operations compared to existing protocols. The IoT service interface protocol may natively support each of the defined service interface operations and primitives described herein. Without such a protocol, the operations and primitives may need to be bound to existing lower-level protocols, for example, SOAP, HTTP, and the like, by the application/service. This may require the application/service to split-up each service interface operation into multiple lower level operations, for example, RESTful Create, Retrieve, Update and Delete operations. Since this splitting up may need to be performed by the application/service it may add extra complexity and overhead to it and result in the similar problems described above. In contrast, using an IoT service interface protocol may enable IoT applications and services to communicate with one another at a higher-level of abstraction and in a more intelligent and efficient manner.

The use of the IoT service interface protocol may not preclude IoT services and applications from also using additional service level APIs layered on top of the service interface protocol layer and supported by the applications and services. The two may be used in a complementary fashion.

The following aspects of the IoT service interface protocol may be defined: IoT service interface protocol messages, for example, message types, formats, headers, options, and the like; IoT service interface proxying functionality; and deployment models showing how the IoT service interface protocol could be deployed over top of other existing protocols.

In addition, the protocol may also support the following proposed advanced IoT service interface features currently lacking in existing protocols. Multiple IoT service interface operations and/or IEs may be batched together within a single service interface request for added optimization and efficiency. A single IoT service interface operation may be performed on multiple IEs. Multiple IoT service interface operations may be performed on a single IE. Multiple IoT service interface operations may be performed on multiple IEs.

Intelligent IoT service interface proxying functionality that may enable intermediate nodes within the network to have awareness of service interface messages that flow through the network and may provide them with the ability to opportunistically perform intelligent service interface operations on these messages may be supported.

An intermediate proxy may interpret IoT service interface messages and the IEs contained within these messages. In doing so, a proxy may increase its awareness of information (content, context, policies, decisions, events, discovery info) flowing through the network. Using this information, a proxy may dynamically adjust its future actions or behavior and/or share this information with its neighboring nodes to allow them to make intelligent adjustments.

An intermediate proxy may enrich IoT IEs contained in IoT service interface messages such as context, policies, events, and the like. For example, a proxy may add/delete IEs from a service interface message, or a proxy may add/delete information contained within an existing IE.

Figure 12:
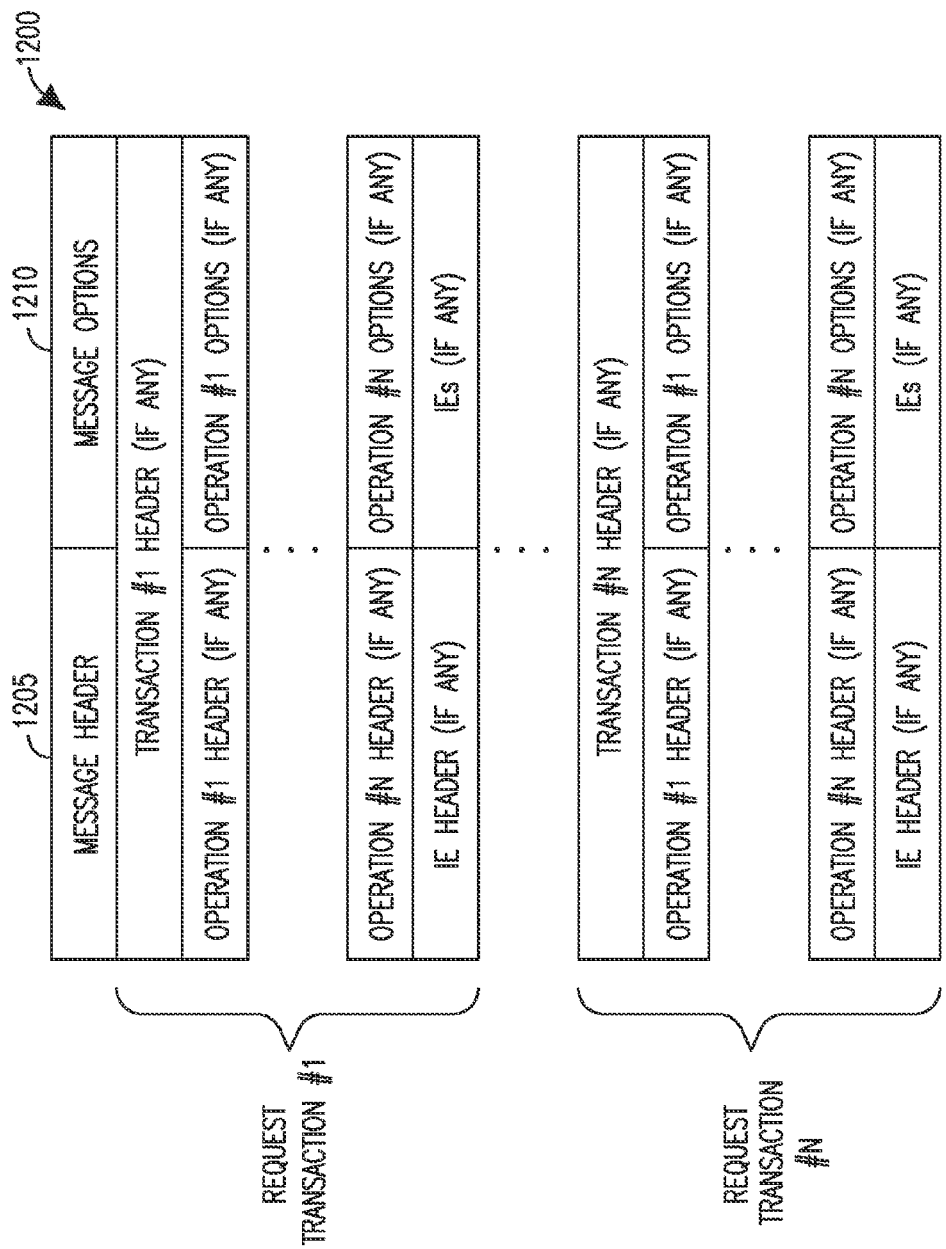
FIG. 12 shows an example IoT service interface request message.

An intermediate proxy may cache IoT service interface messages or individual IEs contained within a service interface message. For example, this caching may be performed in a policy-based, context-aware, and/or content-aware fashion by the proxy. The cached messages and/or IEs may be used by the proxy to service future requests Three fundamental IoT service interface protocol message types may be defined: request, response, and acknowledgement. Each of the message types is shown in FIGS. 12-14. The request and response messages may be logically bound to the request and response primitives defined above.

A message may include a message header and may also contain one or more message options, transaction headers, operation headers, operation options, IE options and IEs. The protocol may be extensible and additional message types and/or fields may be defined if future use-cases warrant it. Alternatively, messages and/or information contained within existing fields of messages may be re-structured, for example, combined, separated, and the like, if warranted.

Depending on the type of message, certain fields within the message may or may not be applicable. For example, for a service interface request, all fields may be applicable. While for a response, the operation header and operation options fields may not be applicable. Likewise for an acknowledgement, the message header and transaction header may only be applicable. A message may also contain multiple transactions, for example, requests, responses or acknowledgements, batched together in the same message. The different parts of a message are described herein.

FIG. 12 shows an example IoT service interface request message 1200, FIG. 13 shows an example IoT service interface response message 1300, and FIG. 14 shows an example IoT service interface acknowledgement message 1400, each including an IoT service interface message header 1205 and message options 1210. The message options 1210 may reside in the message header 1205.

FIG. 15 shows an example of the format of the IoT service interface message header 1205 and message options 1210 in messages 1200, 1300 and 1400.

The defined message header 1205 may be scalable in nature and selected fields may be elided, for example, not included and default values assumed by the recipient, under applicable circumstances. The message header 1205 may include a version field 1505, a message type field 1510, a message identification (ID) field 1515, a message option count field 1520 and a quality of service (QoS) field 1525.

The version field 1505 may be used to indicate a service interface version that the message complies to. The message type field 1510 may be used to specify the type of message, for example request, response, acknowledgement, and the like. The message ID field 1515 may be used by the issuer for matching requests and responses as well as by the issuer/recipient for duplicate message detection. The message option count field 1520 may be used to specify the number of message options contained within the message, for example, options applicable to the entire message vs. options applicable to a specific operation or information element in the message. If no message options are included in the message, the message option count field 1520 may be elided which may be interpreted as zero message options by the recipient. The QoS field 1525 may be used to specify the level of QoS for the message. For example, whether the request may be ACK'd by the recipient, how many times a recipient should retry a failed response, and the like. The QoS field 1525 may be elided from a message and a default QoS level may be used to process the message.

FIG. 16 shows an example of the format of the IoT service interface message options 1210. This format may be scalable in nature and selected fields may be elided, for example, not included and default values assumed by the recipient, under applicable circumstances. The message options 1210 may include a message option code field 1605, a message option length field 1610, an applicability option value field 1615 and a message option value field 1620.

The message option code field 1605 may specify the type of message option. The following are some examples of different types of message options. A numTransactions message may be used to specify the number of transactions batched together in this message. Depending on the type of message, this may equate to the number of requests, responses or acknowledgements batched together in this message. If not present, the recipient of the message may infer that only a single transaction is included in the message. A recipientID message may be used to specify the recipient of the message, for example, a service ID. This may be optional if the recipient is specified in lower level protocols. A proxy message may be used to specify a specific service level proxy to process this message or an indication that this message can be processed by any available proxy. A contentType message may be used to specify the format in which remaining portions of the message are encoded in, for example, operation headers, operation options, IE headers and/or IEs. A priority/schedule message may define priority information that a recipient may use to prioritize or schedule the servicing of the message with respect to other messages, for example, high, medium, low, relative delay, absolute date/time, and the like. This field may also be used by intermediate service level proxies for such things as calculating how long the proxy may store the message before forwarding the message.

A cache message may be used to specify whether this message or any of its operations may be cached by the recipient or intermediate service level proxies in the network. The cache may also be used to define caching parameters such as cache lifetime, cache refresh policies, and the like. An atomic/order message may be used to specify how the individual operations are to be performed, such as whether the operations in a message may be performed by a single recipient, whether an intermediate proxy may split the operations in the message into multiple messages and distribute the messages to multiple recipients, whether the operations in the message may be completed sequentially in the order in which they are listed in the message, or whether the operations in a message may be split and re-grouped into other messages by service level proxies in the network. An enrich message may be used to specify whether this message may be enriched with additional information by service level proxies as the message travels through the network and what type of enrichment is permitted.

For example, Node 2 may ask Node 1 for the temperature. Node 1 may respond that it does not know the temperature, but some intermediate node, that does know the temperature, may enrich the response with the temperature. This may also enable un-solicited responses from nodes in the network, for example, Node 1 may ask Node 2 for the temperature. Node 2 may respond that it does not know or perhaps may not respond at all. Node 3 may overhear the question and/or response. Node 3 may know the temperature, so it may transmit an unsolicited response to Node 1 with the temperature.

The message option length field 1610 may specify the length of the message option value.

The applicability to operations field 1615 may specify which operations, if any, in the message this option is applicable to, for example, all, a select group, one or none. If the message option is not applicable to any operations this field may optionally be elided.

The message option value field 1620 may specify the value of the option which depending on the type of option can be varying in format, for example, integer, string, and the like.

FIG. 17 shows an example of the format of an IoT service interface message transaction header 1700. This format may be scalable in nature and selected fields may be elided, for example, not included and default values assumed by the recipient, under applicable circumstances. The IoT service interface message transaction header 1700 may include a transaction type field 1705, a transaction ID field 1710, a number of operations field 1715, and a response/acknowledgement (ACK) code field 1720.

The transaction type field 1705 may be used to specify the type of transaction, for example request, response, acknowledgement, and the like. The transaction ID field 1710 may be used by the issuer for matching requests and responses as well as by the issuer/recipient for duplicate transaction detection. The number of operations field 1715 may be used to specify the number of operations contained within the transaction. The response/ACK code field 1720 may be used to specify the ACK code in an acknowledgement transaction or response code in a response transaction. The response/ACK code field 1720 may not be applicable to a request transaction.

FIG. 18 shows an example of the format of an IoT service interface message operation header 1800. This format may be scalable in nature and selected fields may be elided, for example, not included and default values assumed by the recipient, under applicable circumstances. The IoT service interface message operation header 1800 may include an operation ID field 1805, an operation type field 1810, an operation option count field 1815 and an operation length field 1820.

The operation ID field 1805 may be used for matching operation requests, responses and acknowledgements as well as duplicate operation detection. If only a single operation is included in the transaction, then this field may be optional and the transactionID field may be used as the operation ID.

The operation type field 1810 may be used to specify the type of service level operation as shown in FIG. 7. One or more operations may be included in a single transaction and each may have their own type. Some possible formats of the operation type may include a unique bit sequence/value for each operation or alternatively a URI may be used which targets a resource that is associated with a particular type of operation.

The operation option count field 1815 may be used to specify the number options associated with an operation. One or more operations may be included in a single transaction and each may have their set of options and hence their own option count. If no options are included for the operation, this field may be elided which may be interpreted as zero operation options by the recipient.

The operation length field 1820 may specify the length of the overall operation including operation options and IEs associated with the operation.

FIG. 19 shows an example of the format of an IoT service interface message operation option 1900, which defines options applicable to operations within a transaction. A single message may have multiple transactions batched within the message. Each transaction in the message may include multiple operations batched together. This format may be scalable in nature and selected fields may be elided, for example, not included and default values assumed by the recipient, under applicable circumstances. The IoT service interface message operation option 1900 may include an operation option code field 1905, an operation option length field 1910, an applicability to IEs field 1915 and an operation option value field 1920.

The operation option code field 1905 may specify the type of operation option. The following are some examples. A numInfoElements option may be used to specify the number of IEs associated with an operation. One or more operations may be included in a single transaction and each may have one or more IEs. If no IEs are associated with an operation, this field may be elided which may be interpreted as zero IEs by the recipient. A trigger/policy option may be used to specify trigger conditions, for example, events, and/or policies for which the recipient uses to qualify performing the operation. These trigger conditions or policies may be passed as IEs in the operation itself or may be included as references to IEs, for example, that may be stored/hosted on remote nodes in the network that may first be accessed by the recipient before performing the operation. A context option maybe used to specify context information related to the operation to be performed by the recipient. Context information may be used by the recipient to more intelligently process the operation. For example, knowing the location of the issuer of a discover operation, the recipient may factor this context into the discovery response it returns to the issuer, such as taking proximity into account. This context information may be passed as IEs in the operation itself or can be included as references to IEs, for example, that may be stored/hosted on remote nodes in the network that may first be accessed by the recipient before performing the operation.

A priority/schedule option may define priority or schedule information that a recipient can use to selectively prioritize or schedule the servicing of the operation with respect to other operations in the transaction. A cache option may be used to selectively specify whether this particular operation may be cached by the recipient or intermediate service level proxies in the network. The cache option may also be used to define caching parameters such as cache lifetime, cache refresh policies, and the like. A pre-requisiteOperations option may be used to specify operations that may be performed before this operation is performed. A contentType option, for a request, may be used to specify the format in which operation options, IEs options and/or IEs that are included in this operation are encoded in. A contentType option, for a response, may be used to specify the format IE(s) included in the response. If the contentType is the same that is specified in the message contentType option, then this field may be optional. An enrich option may be used to selectively specify whether this particular operation may be enriched by the recipient or intermediate service level proxies in the network. The enrich option may also be used to define enrichment policies or preferences, and the like.

The operation option length field 1910 may specify the length of the operation option value.

The applicability to IEs field 1915 may specify which IEs, if any, this option is applicable to, for example, all, a select group, one or none. If the operation option is not applicable to any IEs this field may optionally be elided.

The operation option value field 1920 may specify the value of the option which depending on the type of option may be varying in format, for example, integer, string, and the like.

FIG. 20 shows an example of the format of an IoT service interface message IE header 2000. This format may be scalable in nature and selected fields may be elided, for example, not included and default values assumed by the recipient, under applicable circumstances. The IoT service interface message IE header 2000 may include an IE ID field 2005, an IE type field 2010, an IE contentType field 2015 and an IE length field 2020.

The IE ID field 2005 may be used for identifying IEs. The IE type field 2010 may be used to specify the type IE, for example, content, context, policy, and the like. The IE contentType field 2015 may be used to specify the format of the associated IE. If the contentType is the same that is specified in the message contentType option or the operation contentType option, then this field 2015 may be optional. The IE length field 2020 may specify the length of the IE.

An IE may contain a representation or a reference to an IE. For example, a representation or reference to an IoT IE may be used. An IE may also reference a group of IEs. A message may contain zero or more IEs and/or links to IEs, for example, Universal Resource Identifiers (URIs). IEs may represent the objects upon which the operation is being performed upon. For example, the SHARE operation, may include IE(s) which an issuer of the operation wishes to share with a recipient, such as one service instance shares context IE with another service instance. Therefore, in terms of interfaces, the IEs may represent the objects that are transferred across interfaces as well as the objects upon which interface operations are performed upon.

FIG. 21 shows an example IoT service interface message IE format 2100 that comprises the IoT service interface message IE header 2000. One of ordinary skill in the art will appreciate that other IE formats may be used.

Methods for supporting IoT service level proxying capability via messages and fields supported by the IoT service interface protocol are described herein.

Figure 22:
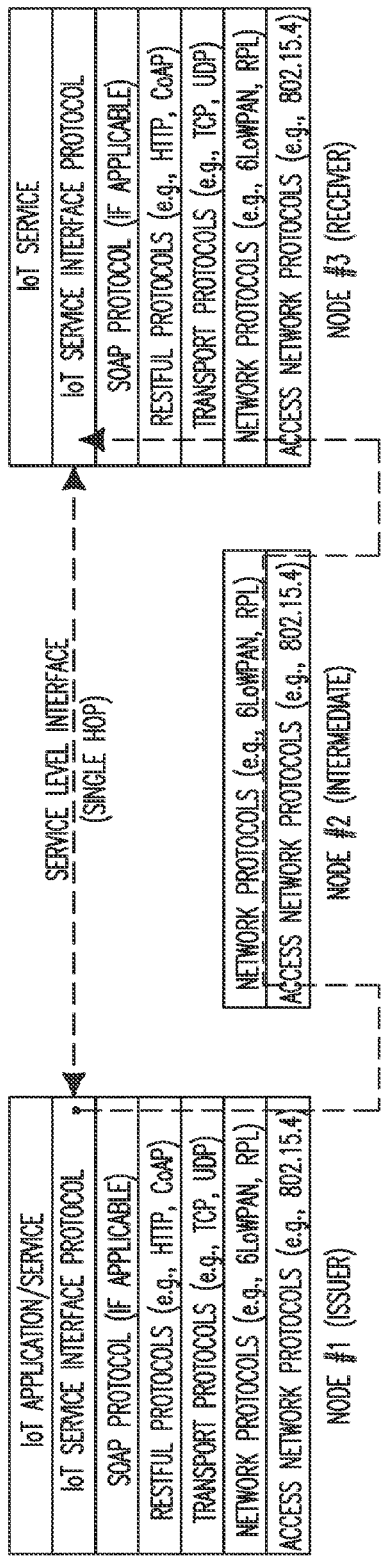
FIG. 22 shows an example of a direct (single hop) communication between issuer and receiver.

FIG. 22 shows an example of a direct (single hop) communication between issuer and receiver. The scope of an IoT service interface operation may be restricted to direct communication involving a single service interface hop between the issuer and the receiver, for example, two services or a service and an application. In this case, there may be no service level proxying performed. For example, an issuing service instance may form a request with a specified operation and this request may be transmitted to a recipient service instance that may be directly connected to the issuer service via a single hop service interface. However, there may be intermediate network nodes between issuer and receiving nodes which perform lower layer communication, for example, IP routers like Node #2, as shown in FIG. 22.

Figure 23:
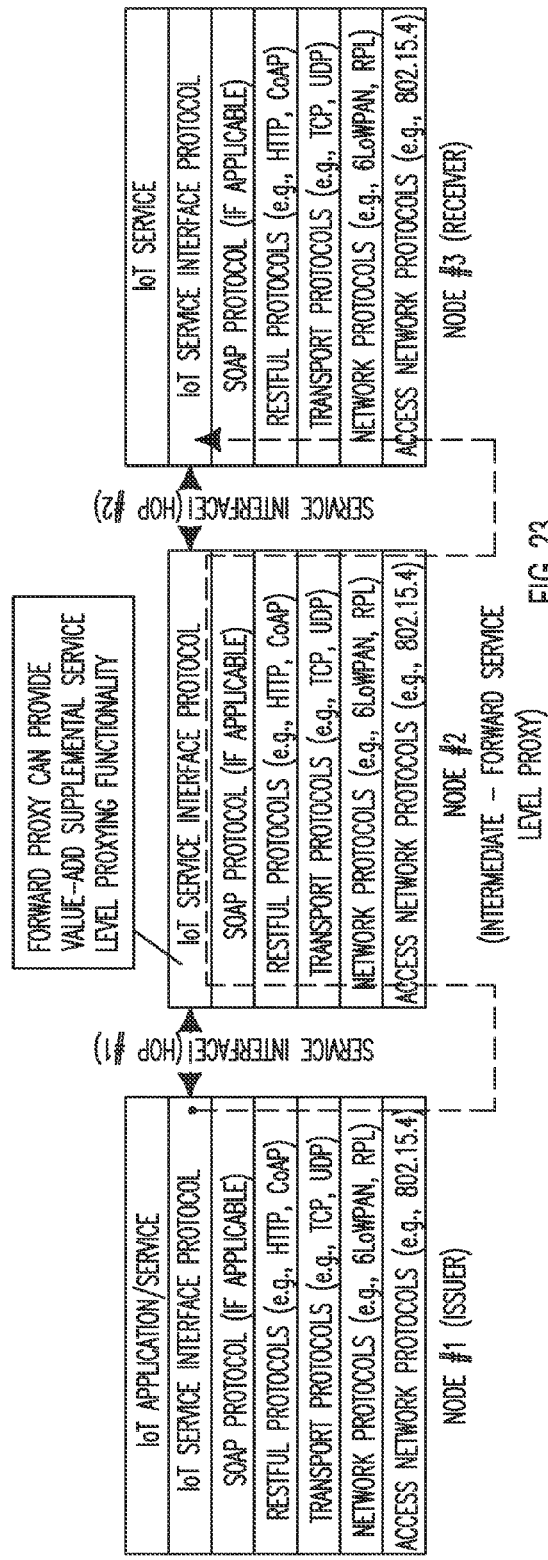
FIG. 23 shows an example of a forward IoT service proxy-based communication between issuer and receiver.

FIG. 23 shows an example of a forward IoT service proxy-based communication between issuer and receiver. Alternatively, an IoT service interface operation may involve indirect communication and span across multiple service interface hops as illustrated in FIG. 23. For example an issuer service instance may form a request with a specified operation that targets a recipient service instance that is not directly connected to the issuer via a service interface. Instead the request may be forwarded to one or more intermediate nodes that may act as service level proxies. The intermediate nodes may proxy the request on behalf of the issuer to the targeted recipient(s). Upon receiving this request, the recipient may process it and may return a response to the issuer which in turn travels through the proxy back to the issuer. This may be called 'forward service level proxying'.

Figure 24:
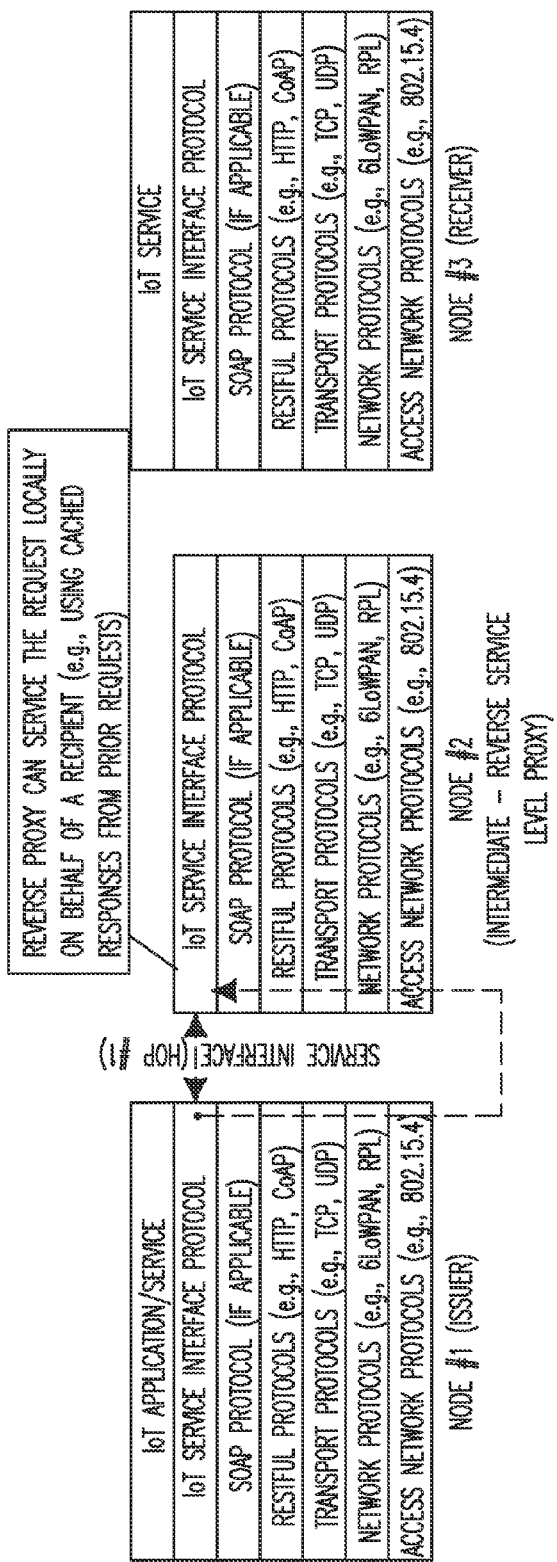
FIG. 24 shows an example of a reverse IoT service interface proxy-based communication between issuer and receiver.

FIG. 24 shows an example of a reverse IoT service interface proxy-based communication between issuer and receiver. Conversely, an IoT service interface proxy may also function as a 'reverse service interface proxy'. A reverse service interface proxy may be responsible for processing service interface requests on behalf of an intended recipient. For example, a reverse service interface proxy may use cached responses from prior service interface requests to service new requests that it may receive as illustrated in FIG. 24.

IoT service interface proxies may perform value-added supplemental services. The services may be performed by the service interface proxy in an intelligent manner by leveraging information contained in the message itself such as content semantics, context information, policy information, event information, decision information, and the like. The service interface proxy may also leverage information it collects and may manage itself independent of the information contained in the message. Using this information, the service interface proxy may cognitively make decisions regarding whether or not to perform the following services as well as how the following services may be performed as messages flow through the service interface proxy.

For intelligent service layer proxying, IoT service interface proxies may proxy and reverse proxy service interface messages on behalf of issuers and recipients. For example, a service interface message may be intelligently proxied by a service interface proxy to one or more recipients or other service interface proxies based on dynamically changing context information and policies related to network congestion and loading. Similarly a service interface message may be reversed proxied by the service interface proxy performing the operation(s) specified in the message on behalf of the recipient(s). In doing this, the service interface proxy may offload the recipient(s) from having to perform such tasks.

For intelligent service layer fragmentation, IoT service interface proxies may fragment the multiple operations contained in a service interface message into one or more service interface messages, for example, to distribute service interface operations across multiple recipients to perform or to fragment a response service interface message containing multiple responses into individual responses.

For intelligent service layer assembly, IoT service interface proxies may assemble transactions and/or operations contained in multiple service interface messages into a single message, for example, to consolidate service interface operations targeting the same recipient. Similarly, a service interface proxy may assemble multiple individual service interface responses into a single service interface message.

For intelligent service layer enrichment, IoT service interface proxies may enrich service interface messages, for example, dynamically adding additional information to a service interface message such as context, event or policy information. In addition, unsolicited messages may also be supported. For example, based on information that was previously processed, the proxy may know that node A needs to shut down in the rain. The proxy may observe messages that are exchanged between nodes G and H that indicate an upcoming storm. The proxy may transmit an unsolicited message to node A informing it that it may rain soon and in turn to shut down.

For intelligent service layer caching, IoT service interface proxies may cache service interface response messages or IoT IEs contained in an IoT service interface request messages such that the responses/information may be used to service future service interface requests. For example, caching certain types of content, or caching content based off of context information such as location from which the content originated, or caching based off of policies that a service interface proxy may use to decide whether or not to cache an IoT IEs.

For intelligent service layer store/forwarding, IoT service interface proxies may store/forward service interface messages or individual operations contained in service interface messages, for example, store/forwarding certain types of content, or store/forwarding content based off of context information such as location from which the content originated, or store/forwarding based off of policies.

For intelligent service layer publishing/subscribing, IoT service interface proxies may support subscriptions from other services and applications. For example, subscriptions to receive certain types of service interface messages which flow through a service interface proxy, subscriptions to receive certain operations contained within service interface messages, subscriptions to receive certain service interface responses, subscriptions to receive certain types of IEs. Likewise, the service interface proxy may support publishing corresponding service interface messages, operations, responses, and IEs to subscribing services and applications.

Figure 25:
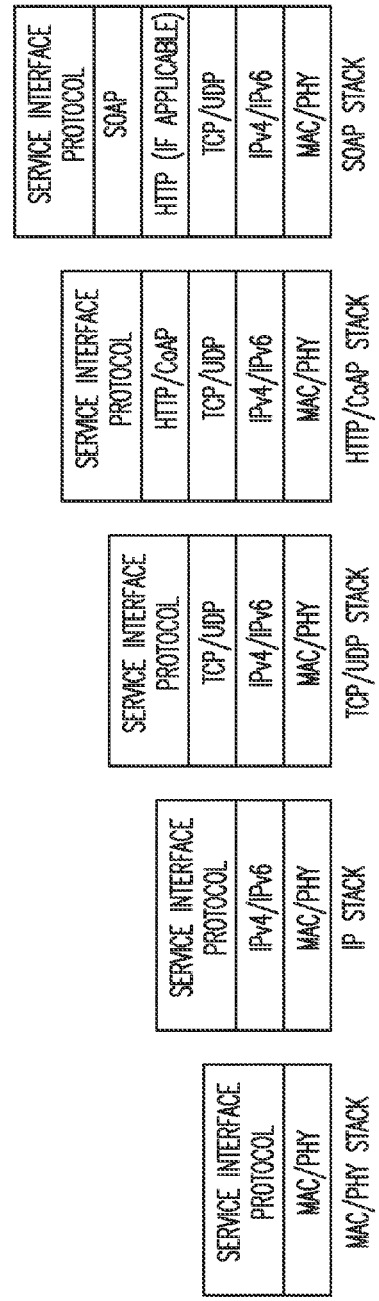
FIG. 25 shows an example of a service interface protocol.

FIG. 25 shows an example of a service interface protocol. In addition to layering the IoT service interface protocol over HTTP and SOAP based protocol stacks, the IoT service interface protocol ay alternatively be layered over the top of other existing protocols. For example, a MAC/PHY, IP, TCP/UDP, HTTP/CoAP or SOAP stack may be used as shown in FIG. 25. Thus, different types of intelligent services may be supported for different types of use cases. For example, context aware MAC layer connectivity services, content-aware IP routing services, event-based TCP connection establishment service, and intelligent services for applications supported over HTTP, CoAP or SOAP may be supported.

By layering the service interface protocol over top of existing protocols, the service interface protocol messages may be tunnelled through these lower layer protocols, for example, encapsulated in the payloads of lower level protocols acting as transports.

Figure 26:
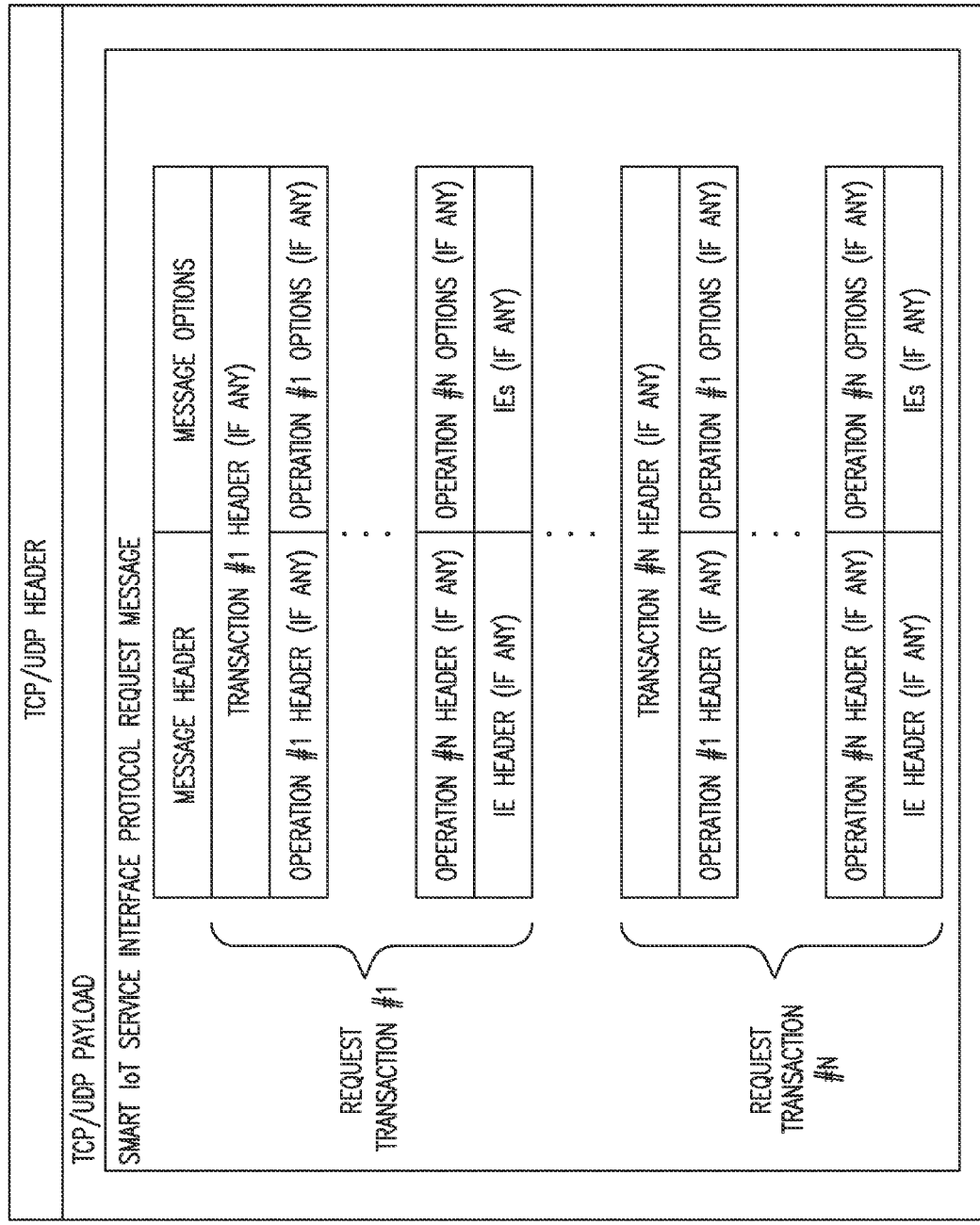
FIG. 26 shows an example of how a service interface protocol message may be encapsulated and carried within a transmission control protocol (TCP) or a user datagram protocol (UDP) message.

FIG. 26 shows an example of how a service interface protocol message may be encapsulated and carried within a TCP or UDP message. As a result, the service interface protocol may become an additional layer of protocol over the top of a TCP/UDP IP layer protocol stack.

Figure 27:
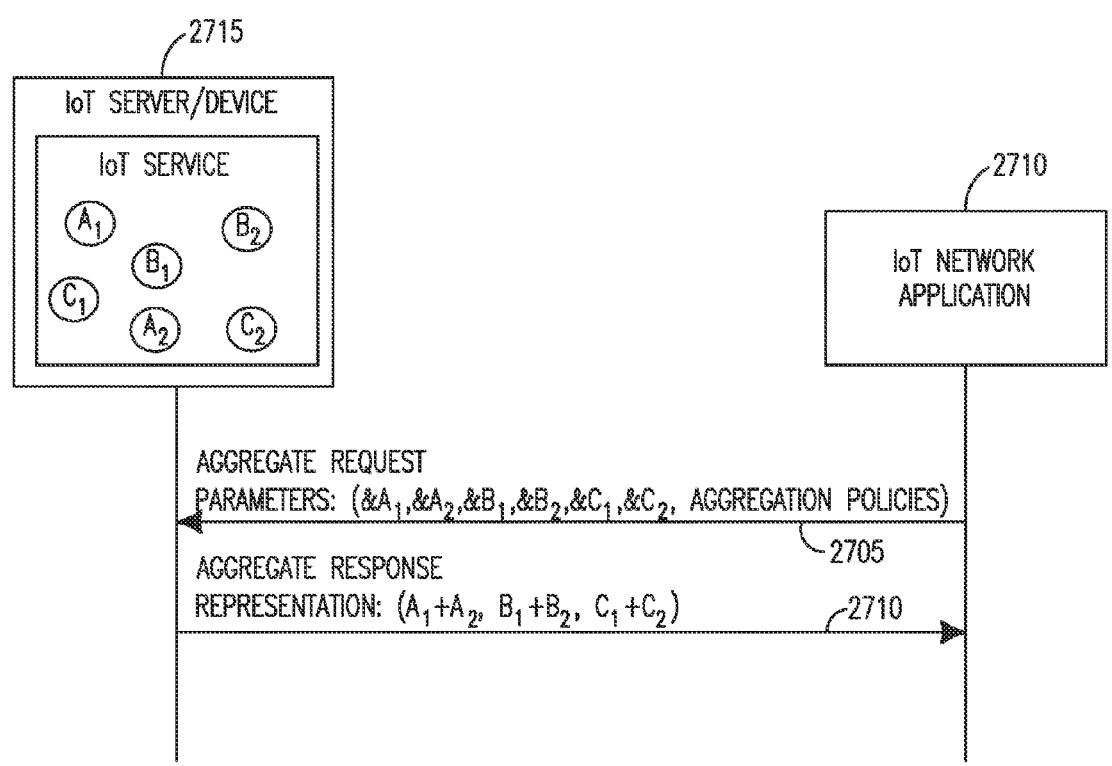
FIG. 27 shows an example of a smart IoT service level interface use case.

FIG. 27 shows an example of a smart IoT service level interface use case. In this example, an IoT Service Interface AGGREGATE request 2705 may be issued from an IoT network application 2710 to an IoT aggregation service hosted on an IoT server/device 2715. The IoT Service Interface AGGREGATE request 2705 may include addresses, for example, URI links, of resources that the IoT network application 2710 may request be collected by the IoT server/device 2715 and aggregate on its behalf. Also included in the request may be an aggregation policy specified by the IoT network application 2710 that specifies the rules that an IoT aggregation service provided by the IoT server/device 2715 may use to perform the aggregation. Upon receiving the IoT Service Interface AGGREGATE request 2705, the IoT aggregation service may aggregate the resource representations based on the aggregation policy specified by the IoT network application, for example, $A_1+A_2$, $B_1+B_2$, $C_1+C_2$. The IoT aggregation service may then transmit an IoT Service Interface AGGREGATE response 2710 back to the IoT network application 2710 containing the aggregated response.

From this example use-case, benefits of the IoT Service Interface protocol may be observed. For example, the use case may demonstrate the feasibility of standardization of higher-level and more intelligent interface protocols which may have many advantages such as increased interoperability. In addition, IoT service interface protocols may enable the evolution of IoT services into more intelligent services which communicate with one another in a more distributed and intelligent manner using operations with a higher-level of abstraction and an increased awareness of higher-level information, for example, content, context, policies, events, and the like. The efficiency of the IoT service interfaces between the nodes may also be observed. Compared to existing protocols, for example, HTTP, the IoT Service Interface protocol messages exchanged may enable more efficient communication due to the increased level of abstraction of the interface operations.

Figure 28:
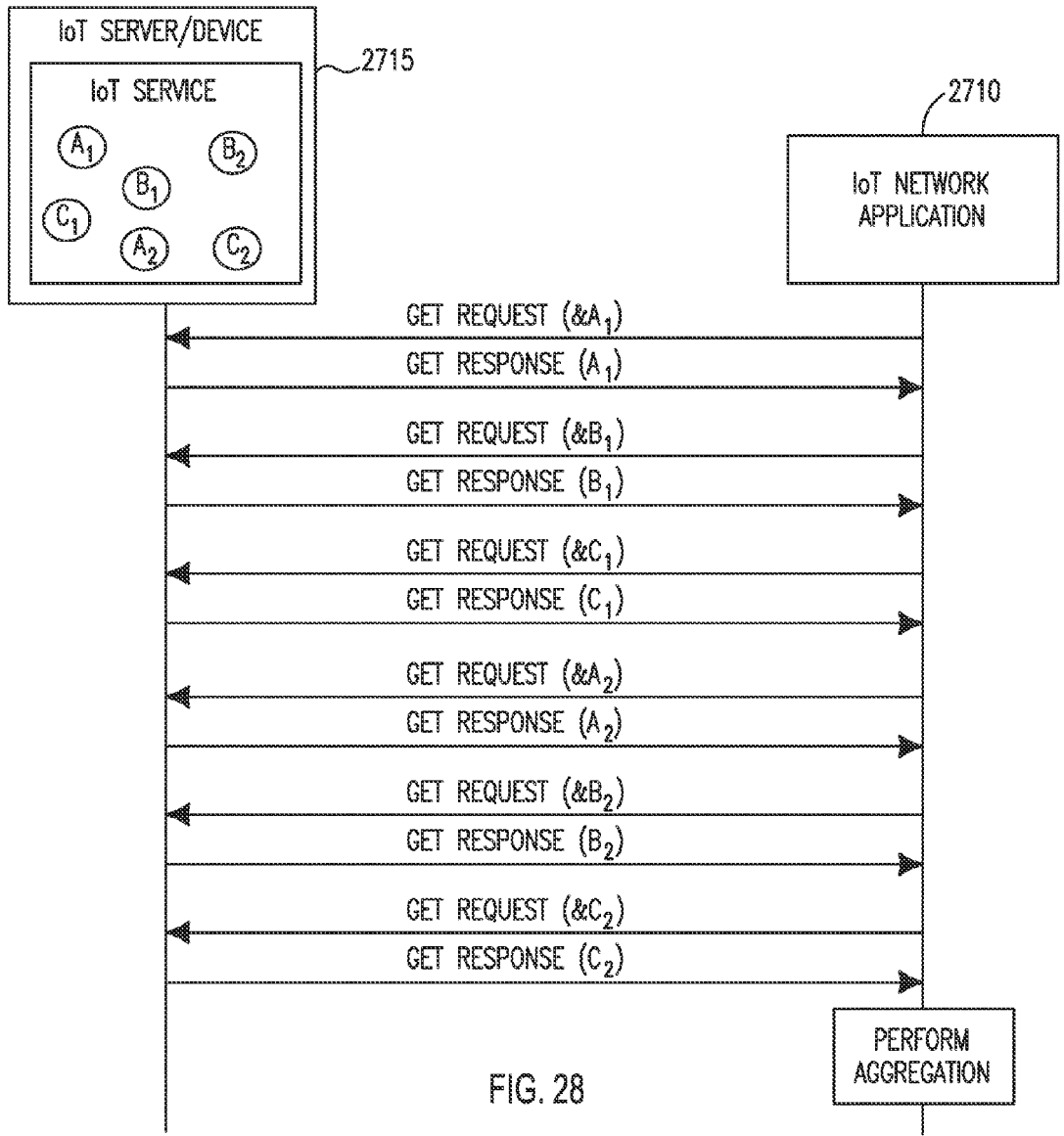
FIG. 28 shows an example use case comparison to hypertext transfer protocol (HTTP)

FIG. 28 illustrates a call flow for the same use case which uses HTTP protocol messaging instead of IoT service interface protocol messaging. Comparing the two approaches, the increased number of messages exchanged may increase, which may lead to inefficiencies and increased overhead in the network and on the network nodes. For example, as shown in FIG. 28, individual GET request/response message exchanges may be required by the IoT network application 2710 to fetch each of the resources. This may be due to the lower level of abstraction supported by the HTTP messages. Further, the level of abstraction of the protocol may change. HTTP may support a limited set of operations (GET, PUT, POST, DELETE), as well as provide limited awareness of higher-level information. Due to these limitations, HTTP may not be able to support higher-level operations, such as AGGREGATE, nor may it support awareness of higher-level information such as policies. As a result, the burden of supporting higher-level operations and awareness of higher-level information may be pushed up into the application (or services) to support rather than being supported by a lower-level service protocol layer. In the example, this may be seen by the fact that the aggregation is performed by the IoT network application itself rather than by the IoT service protocol layer. This may not only increase the complexity of applications and services, but it may also present a barrier for standardization, since application and/or service developers are likely to implement this type of support in their own proprietary way.

Figure 29:
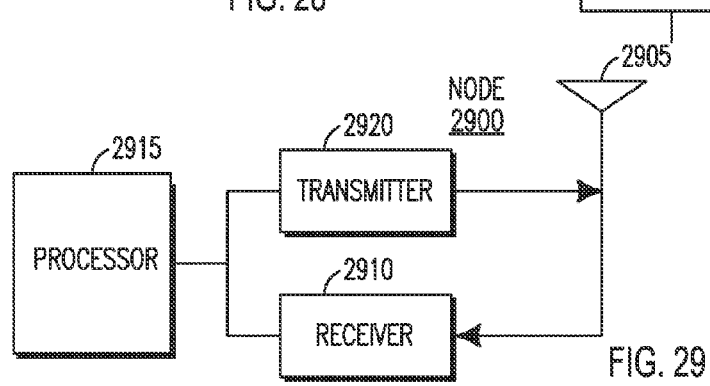
FIG. 29 shows a block diagram of a node.

FIG. 29 shows a block diagram of a wireless communication node 2900 including at least one antenna 2905, a receiver 2910, a processor 2915 and a transmitter 2920. A non-transitory computer-readable storage medium (not shown) may run on the processor 2910 to define a set of IoT service level operations in the node 2900, and perform the IoT service level operations on IoT IEs.

The transmitter 2920 of the node 2900 may be configured to transmit IoT service interface messages via the antenna 2905. The receiver 2910 of the node 2900 may be configured to receive IoT service interface messages via the antenna 2905. The processor 2915 of the node 2900 may be configured with an IoT service interface protocol layer, wherein a set of IoT service level operations are defined, and IoT service level operations are performed on IoT IEs.

Embodiments

1. A wireless communication method of incorporating an Internet of Things (IoT) service interface protocol layer in at least one node, the method comprising:

defining a set of IoT service level operations in the at least one node.

2. The method of embodiment 1 further comprising:
performing the IoT service level operations on IoT information elements (IEs).

3. The method as in any one of embodiments 1-2 wherein the IoT service level operations are defined in terms of actions including at least one of connect, disconnect, publish, un-publish, discover, associate, de-associate, collect, compose, de-compose, subscribe, un-subscribe, notify, concatenate, de-concatenate, aggregate, share, relocate, synchronize, revoke, delegate, surrogate, relieve, invoke, interpret, annotate, extract, spawn, cease collaboration, decide, adapt, virtualize, or de-virtualize.

4. The method of embodiment 3 wherein the actions are generic and applicable across industry verticals.

5. The method as in any one of embodiments 2-4 wherein the IoT IEs include at least one of a content IoT IE, a context IoT IE, a policy IoT IE, a decision IoT IE, an event IoT IE, a discovery IoT IE or a descriptor IoT IE.

6. The method as in any one of embodiments 1-4 wherein the operations can leverage each other as sub-operations.

7. The method of embodiment 6 wherein the sub-operations include at least one of collaborate, share, synchronize, discover, associate, collect, aggregate, concatenate, share, relocate, invoke, delegate or surrogate.

8. The method as in any one of embodiments 1-7 wherein service interface communication is carried out between the at least one node and a second node, the method further comprising:

the at least one node transmitting an IoT service interface request message to the second node;

the at least one node receiving an IoT service interface response message from the second node; and the at least one node transmitting an IoT service interface acknowledgement message to the second node.

9. The method of embodiment 8 wherein at least one of the messages include an IoT service interface message header having at least one of a version field, a message type field, a message identification (ID) field, a message option count field or a quality of service (QoS) field.

10. The method of embodiment 8 wherein at least one of the messages include an IoT service interface message option including at least one of a message option code field, a message option length field, an applicability to operations field or a message option value field.

11. The method of embodiment 8 wherein at least one of the messages include an IoT service interface message transaction header having at least one of a transaction type field, a transaction identification (ID) field, a number of operations field or a response/acknowledgement (ACK) code field.

12. The method of embodiment 8 wherein at least one of the messages include an IoT service interface message operation header having at least one of an operation identification (ID) field, an operation type field, an operation option count field or an operation length field.

13. The method of embodiment 8 wherein at least one of the messages include an IoT service interface message operation option having at least one of an operation option code field, and operation option length field, an applicability to information elements (IEs) field or an operation option value field.

14. The method of embodiment 8 wherein at least one of the messages include an IoT service interface message information element (IE) header having at least one of an IE identification (ID) field, an IE type field, and IE content type field or an IE length field.

15. A wireless communication node comprising:
a transmitter configured to transmit Internet of Things (IoT) service interface messages; and
a receiver configured to receive IoT service interface messages.

16. The node of embodiment 15 further comprising:
a processor configured with an IoT service interface protocol layer, wherein a set of IoT service level operations are defined, and IoT service level operations are performed on IoT information elements (IEs).

17. The node of embodiment 16 wherein the IoT service level operations are defined in terms of actions including at least one of connect, disconnect, publish, un-publish, discover, associate, de-associate, collect, compose, de-compose, subscribe, un-subscribe, notify, concatenate, de-concatenate, aggregate, share, relocate, synchronize, revoke, delegate, surrogate, relieve, invoke, interpret, annotate, extract, spawn, cease collaboration, decide, adapt, virtualize, or de-virtualize.

18. The node as in any one of embodiments 16-17 wherein the IoT IEs include at least one of a content IoT IE, a context IoT IE, a policy IoT IE, a decision IoT IE, an event IoT IE, a discovery IoT IE or a descriptor IoT IE.

19. The node as in any one of embodiments 16-18 wherein the operations can leverage each other as sub-operations.

20. The node of embodiment 19 wherein the sub-operations include at least one of collaborate, share, synchronize, discover, associate, collect, aggregate, concatenate, share, relocate, invoke, delegate or surrogate.

21. The node as in any one of embodiments 15-20 wherein the transmitter is configured to transmit an IoT service interface request message to a second node, the receiver is configured to receive an IoT service interface response message from the second node, and the transmitter is further configured to transmit an IoT service interface acknowledgement message to the second node.

22. The node as in any one of embodiments 15-21 wherein at least one of the messages include an IoT service interface message header having at least one of a version field, a message type field, a message identification (ID) field, a message option count field or a quality of service (QoS) field.

23. The node as in any one of embodiments 15-22 wherein at least one of the messages include an IoT service interface message option including at least one of a message option code field, a message option length field, an applicability to operations field or a message option value field.

24. The node as in any one of embodiments 15-23 wherein at least one of the messages include an IoT service interface message transaction header having at least one of a transaction type field, a transaction identification (ID) field, a number of operations field or a response/acknowledgement (ACK) code field.

25. The node as in any one of embodiments 15-24 wherein at least one of the messages include an IoT service interface message operation header having at least one of an operation identification (ID) field, an operation type field, an operation option count field or an operation length field.

26. The node as in any one of embodiments 15-25 wherein at least one of the messages include an IoT service interface message operation option having at least one of an operation option code field, and operation option length field, an applicability to information elements (IEs) field or an operation option value field.

27. The node as in any one of embodiments 15-26 wherein at least one of the messages include an IoT service interface message information element (IE) header having at least one of an IE identification (ID) field, an IE type field, and IE content type field or an IE length field.

28. A non-transitory computer-readable storage medium configured to define a set of IoT service level operations in at least one node.

29. The non-transitory computer-readable storage medium of embodiment 28 further configured to perform the IoT service level operations on IoT information elements (IEs).

Although features and elements are described above in particular combinations, one of ordinary skill in the art will appreciate that each feature or element may be used alone or in combination with any of the other features and elements. In addition, the embodiments described herein may be implemented in a computer program, software, or firmware incorporated in a computer-readable medium for execution by a computer or processor. Examples of computer-readable media include electronic signals, (transmitted over wired or wireless connections), and computer-readable storage media. Examples of computer-readable storage media include, but are not limited to, a read only memory (ROM), a random access memory (RAM), a register, a cache memory, a semiconductor memory device, a magnetic media, (e.g., an internal hard disc or a removable disc), a magneto-optical media, and an optical media such as a compact disc (CD) or a digital versatile disc (DVD). A processor in association with software may be used to implement a radio frequency transceiver for use in a WTRU, UE, terminal, base station, Node-B, eNB, HNB, HeNB, AP, RNC, wireless router or any host computer.

What is claimed is:
1. A method comprising:
storing, at a first node, predefined service commands;
selecting, at the first node, one of the predefined service commands;
generating, at the first node, a service message comprising a first information element data field and an information element corresponding to the selected predefined service command in the first information element data field;
generating a predefined enrichment command that indicates whether the service message may be responded to by a proxy node;
sending, from the first node to a second node, the generated service message to command the second node to respond to the selected predefined service command;
sending the enrichment command to the second node;
receiving a message from the proxy node that is responsive to the service message sent to the second node based on the proxy node receiving the enrichment command.

2. The method of claim 1 wherein the predefined service commands further comprise at least one of collect, compose, decompose, relocate, delegate, adapt, virtualize, connect, disconnect, publish, un-publish, discover, associate, de-associate, collect, compose, de-compose, subscribe, un-subscribe, notify, concatenate, de-concatenate, aggregate, share, relocate, synchronize, revoke, delegate, surrogate, relieve, invoke, interpret, annotate, extract, spawn, cease collaboration, decide, adapt, virtualize, or de-virtualize.

3. The method of claim 2 wherein the predefined service commands are not associated with a specific web services protocol.

4. The method of claim 1 wherein the predefined service commands comprise an internet of things (IoT) service interface protocol.

5. The method of claim 4, wherein the service message further comprises a number of operations data field that indicates the number of predefined commands within the service message.

6. The method of claim 5 wherein the service message further comprises a response/acknowledgement field that indicates the acknowledgement code in a response transaction to the service message.

7. The method of claim 1 further comprising:
the first node sending an IoT service interface request message to the second node;
the first node receiving an IoT service interface response message from the second node; and
the first node sending an IoT service interface acknowledgement message to the second node.

8. The method of claim 7 wherein the service message comprises an IoT service interface message header having at least one of a version field, a message type field, a message identification (ID) field, a message option count field or a quality of service (QoS) field.

9. The method of claim 7 wherein the service message comprises an IoT service interface message option including at least one of a message option code field, a message option length field, an applicability to operations field or a message option value field.

10. The method of claim 7 wherein the service message comprises an IoT service interface message transaction header having at least one of a transaction type field, a transaction identification (ID) field, a number of operations field or a response/acknowledgement (ACK) code field.

11. The method of claim 7 wherein the service message comprises an IoT service interface message operation header having at least one of an operation identification (ID) field, an operation type field, an operation option count field or an operation length field.

12. The method of claim 7 wherein the service message comprises an IoT service interface message operation option having at least one of an operation option code field, and operation option length field, an applicability to information elements (IEs) field or an operation option value field.

13. The method of claim 7 wherein the service message comprises an IoT service interface message information element (IE) header having at least one of an IE identification (ID) field, an IE type field, and IE content type field or an IE length field.

14. A first node comprising:
a transmitter configured to transmit service interface messages;
a receiver configured to receive service interface messages; and
a processor configured storing predefined service commands;
selecting one of the predefined service commands;
generating a service message comprising a first information element data field and an information element corresponding to the selected predefined service command in the first information element data field;
generating a predefined enrichment command that indicates whether the service message may be responded to by a proxy node;
sending, from the first node to a second node, the generated service message to command the second node to respond to the selected predefined service command;
sending the enrichment command to the second node;
receiving a message from the proxy node that is responsive to the service message sent to the second node based on the proxy node receiving the enrichment command.

15. The first node of claim 14 wherein the predefined service commands further comprise at least one of collect, compose, decompose, relocate, delegate, adapt, virtualize, connect, disconnect, publish, un-publish, discover, associate, de-associate, collect, compose, de-compose, subscribe, un-subscribe, notify, concatenate, de-concatenate, aggregate, share, relocate, synchronize, revoke, delegate, surrogate, relieve, invoke, interpret, annotate, extract, spawn, cease collaboration, decide, adapt, virtualize, or de-virtualize.

16. The first node of claim 14 wherein the predefined service commands comprise an internet of things (IoT) service interface protocol.

17. The first node of claim 16, wherein the service message further comprises a number of operations data field that indicates the number of predefined commands within the service message.

18. The first node of claim 17 wherein the service message further comprises a response/acknowledgement field that indicates the acknowledgement code in a response transaction to the service message.

19. The first node of claim 14 wherein the receiver is configured to receive an IoT service interface response message from the second node, and the processor is further configured to transmit an IoT service interface acknowledgement message to the second node.

20. The first node of claim 14 wherein the service message comprises an IoT service interface message header having at least one of a version field, a message type field, a message identification (ID) field, a message option count field or a quality of service (QoS) field.

21. The first node of claim 14 wherein the service message comprises an IoT service interface message option including at least one of a message option code field, a message option length field, an applicability to operations field or a message option value field.

22. The first node of claim 14 wherein the service message comprises an IoT service interface message transaction header having at least one of a transaction type field, a transaction identification (ID) field, a number of operations field or a response/acknowledgement (ACK) code field.

23. The first node of claim 14 wherein the service message comprises an IoT service interface message operation header having at least one of an operation identification (ID) field, an operation type field, an operation option count field or an operation length field.

24. The first node of claim 14 wherein the service message comprises an IoT service interface message operation option having at least one of an operation option code field, and operation option length field, an applicability to information elements (IEs) field or an operation option value field.

25. The first node of claim 14 wherein the service message comprises an IoT service interface message information element (IE) header having at least one of an IE identification (ID) field, an IE type field, and IE content type field or an IE length field.

26. A non-transitory computer-readable storage medium comprising computer code for:

storing predefined service commands;
selecting one of the predefined service commands;
generating a service message comprising a first information element data field and an information element corresponding to the selected predefined service command in the first information element data field;
generating a predefined enrichment command that indicates whether the service message may be responded to by a proxy node;
sending, from a first node to a second node, the generated service message to command the second node to respond to the selected predefined service command;
sending the enrichment command to the second node;
receiving a message from the proxy node that is responsive to the service message sent to the second node based on the proxy node receiving the enrichment command.

* * * * *